US012626328B2

(12) United States Patent
Shi et al.

(10) Patent No.: US 12,626,328 B2
(45) Date of Patent: May 12, 2026

(54) TRAINING METHOD AND APPARATUS FOR IMAGE PROCESSING NETWORK, COMPUTER DEVICE, AND STORAGE MEDIUM

(71) Applicant: Tencent Technology (Shenzhen) Company Limited, Shenzhen (CN)

(72) Inventors: Shichang Shi, Shenzhen (CN); Fei Huang, Shenzhen (CN); Chao Hua, Shenzhen (CN); Wei Xiong, Shenzhen (CN); Liang Yang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 398 days.

(21) Appl. No.: 18/207,572

(22) Filed: Jun. 8, 2023

(65) Prior Publication Data
US 2023/0334833 A1    Oct. 19, 2023

Related U.S. Application Data

(63) Continuation of application No. PCT/CN2022/117789, filed on Sep. 8, 2022.

(30) Foreign Application Priority Data

Oct. 12, 2021    (CN) .......................... 202111188444.9

(51) Int. Cl.
*G06T 3/4046*        (2024.01)
*G06T 3/4053*        (2024.01)
(Continued)

(52) U.S. Cl.
CPC .......... *G06T 3/4046* (2013.01); *G06T 3/4053* (2013.01); *G06T 5/50* (2013.01);
(Continued)

(58) Field of Classification Search
CPC ....... G06T 3/4046; G06T 3/4053; G06T 5/50; G06T 5/60; G06T 5/73;
(Continued)

(56) References Cited

U.S. PATENT DOCUMENTS

2017/0256033 A1*    9/2017    Tuzel ................... G06F 18/214
2020/0364830 A1    11/2020    Manimaran et al.
(Continued)

FOREIGN PATENT DOCUMENTS

| CN | 108320267 A | 7/2018 |
| CN | 109615582 A | 4/2019 |

(Continued)

OTHER PUBLICATIONS

Lihua Fu et al., "Face Super-Resolution Reconstruction Method Fusing Reference Image", Pattern Recognition and Artificial Intelligence, vol. 33, No. 4, Apr. 8, 2020, 12 pgs.
(Continued)

*Primary Examiner* — Phuoc Tran
(74) *Attorney, Agent, or Firm* — Morgan, Lewis & Bockius LLP

(57)        ABSTRACT

An image processing method is performed by a computer device, which includes: converting initial image data into super-resolution image data using a trained image processing network, a resolution of the super-resolution image data being greater than or equal to a target resolution; performing image quality enhancement processing on the super-resolution image data using the trained image processing network, to obtain first enhanced image data; when there is a face image in the first enhanced image data, performing face enhancement on the face image in the first enhanced image data using the trained image processing network to obtain second enhanced image data; and performing image sharpening processing on the second enhanced image data using
(Continued)

the trained image processing network to obtain sharpened image data.

17 Claims, 12 Drawing Sheets

(51) Int. Cl.

| | |
|---|---|
| *G06T 5/50* | (2006.01) |
| *G06T 5/60* | (2024.01) |
| *G06T 5/73* | (2024.01) |
| *G06V 10/774* | (2022.01) |
| *G06V 10/94* | (2022.01) |
| *G06V 40/16* | (2022.01) |

(52) U.S. Cl.
CPC .................. *G06T 5/60* (2024.01); *G06T 5/73* (2024.01); *G06V 10/774* (2022.01); *G06V 10/95* (2022.01); *G06T 2207/10016* (2013.01); *G06T 2207/20021* (2013.01); *G06T 2207/20081* (2013.01); *G06T 2207/20221* (2013.01); *G06T 2207/30201* (2013.01); *G06V 40/161* (2022.01)

(58) Field of Classification Search
CPC . G06T 2207/10016; G06T 2207/20021; G06T 2207/20081; G06T 2207/20221; G06T 2207/30201; G06T 2207/20084; G06T 2207/10004; G06T 2207/10024; G06V 10/774; G06V 10/95; G06V 40/161; G06V 10/82; G06N 3/0455; G06N 3/0464; G06N 3/048; G06N 3/09; G06N 3/08; G06N 3/045
See application file for complete search history.

(56) References Cited

U.S. PATENT DOCUMENTS

| | | | | |
|---|---|---|---|---|
| 2021/0209732 A1* | 7/2021 | Hu | .......................... | G06T 7/174 |
| 2021/0232803 A1* | 7/2021 | Fu | .......................... | G06N 3/047 |

FOREIGN PATENT DOCUMENTS

| | | | |
|---|---|---|---|
| CN | 111179177 A | 5/2020 | |
| CN | 111462010 A | 7/2020 | |
| CN | 111598182 A | 8/2020 | |
| CN | 112085681 A | 12/2020 | |
| CN | 112508782 A | 3/2021 | |
| CN | 112529776 A | 3/2021 | |
| CN | 112581370 A | 3/2021 | |
| CN | 112598587 A | 4/2021 | |
| CN | 112927172 A | 6/2021 | |
| CN | 113628116 A | 11/2021 | |
| CN | 114511449 A | 5/2022 | |
| WO | WO 2021115242 A1 | 6/2021 | |

OTHER PUBLICATIONS

Tencent Technology, ISR, PCT/CN2022/117789, Oct. 28, 2022, 3 pgs.

Tencent Technology, Indian Office Action, IN Patent Application No. 202347072577, Jul. 4, 2025, 6 pgs.

Tencent Technology, Extended European Search Report, EP Patent Application No. 22880058.7, Aug. 26, 2024, 6 pgs.

Mengyan Li et al., "A Coarse-to-Fine Face Hallucination Method by Exploiting Facial Prior Knowledge", 25th IEEE International Conference on Image Processing (ICIP), Oct. 2018, 5 pgs.

Wenbo Bao et al., "Iterative Convolutional Neural Network for Noisy Image Super-Resolution", IEEE International Conference on Image Processing (ICIP), Sep. 2018, 5 pgs.

Tencent Technology, WO, PCT/CN2022/117789, Jan. 5, 2024, 6 pgs.

Tencent Technology, IPRP, PCT/CN2022/117789, Apr. 16, 2024, 7 pgs.

* cited by examiner

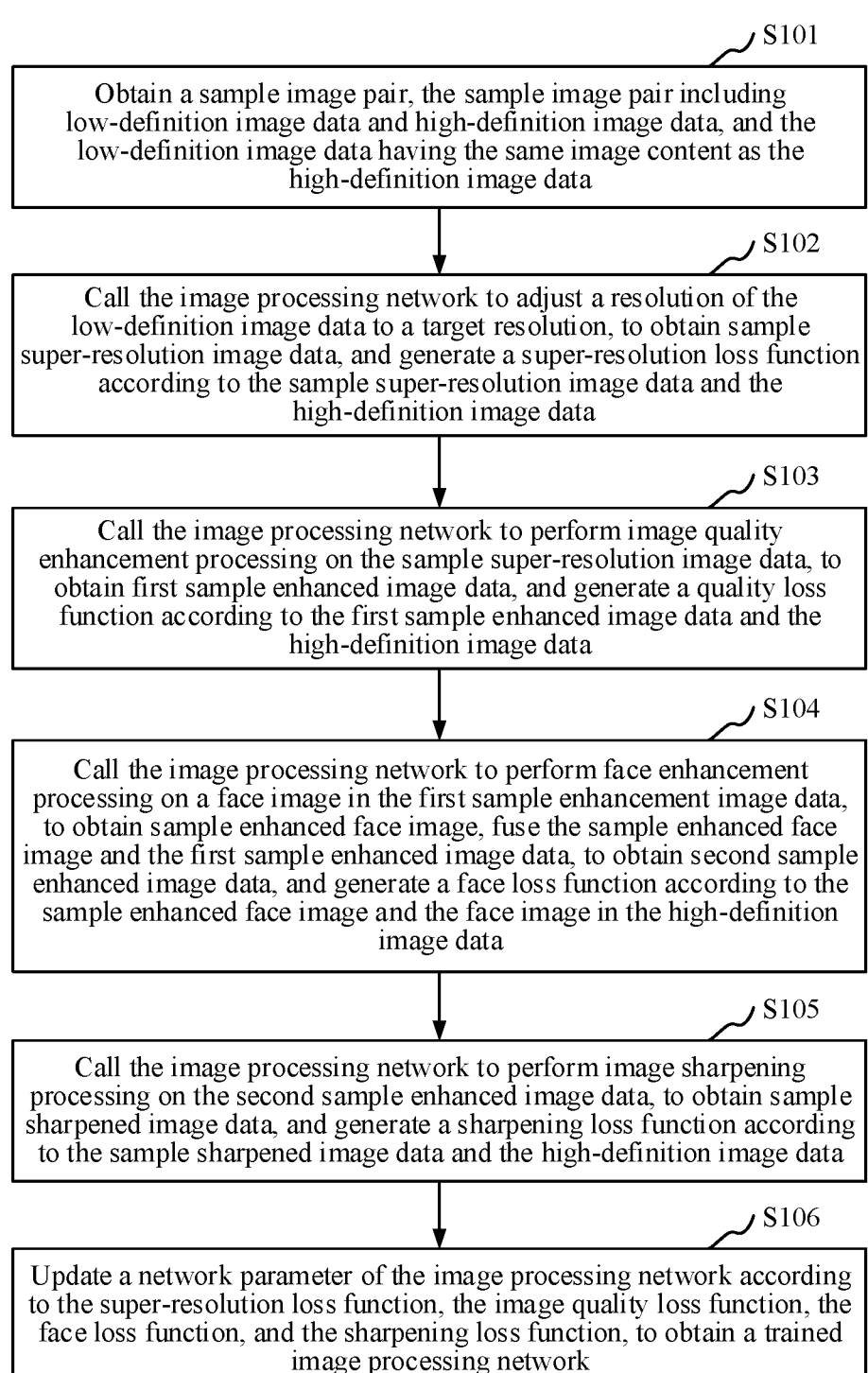

S101

Obtain a sample image pair, the sample image pair including low-definition image data and high-definition image data, and the low-definition image data having the same image content as the high-definition image data

S102

Call the image processing network to adjust a resolution of the low-definition image data to a target resolution, to obtain sample super-resolution image data, and generate a super-resolution loss function according to the sample super-resolution image data and the high-definition image data

S103

Call the image processing network to perform image quality enhancement processing on the sample super-resolution image data, to obtain first sample enhanced image data, and generate a quality loss function according to the first sample enhanced image data and the high-definition image data

S104

Call the image processing network to perform face enhancement processing on a face image in the first sample enhancement image data, to obtain sample enhanced face image, fuse the sample enhanced face image and the first sample enhanced image data, to obtain second sample enhanced image data, and generate a face loss function according to the sample enhanced face image and the face image in the high-definition image data

S105

Call the image processing network to perform image sharpening processing on the second sample enhanced image data, to obtain sample sharpened image data, and generate a sharpening loss function according to the sample sharpened image data and the high-definition image data

S106

Update a network parameter of the image processing network according to the super-resolution loss function, the image quality loss function, the face loss function, and the sharpening loss function, to obtain a trained image processing network

FIG. 3

Sample image pair (low-definition image data and high-definition image data)

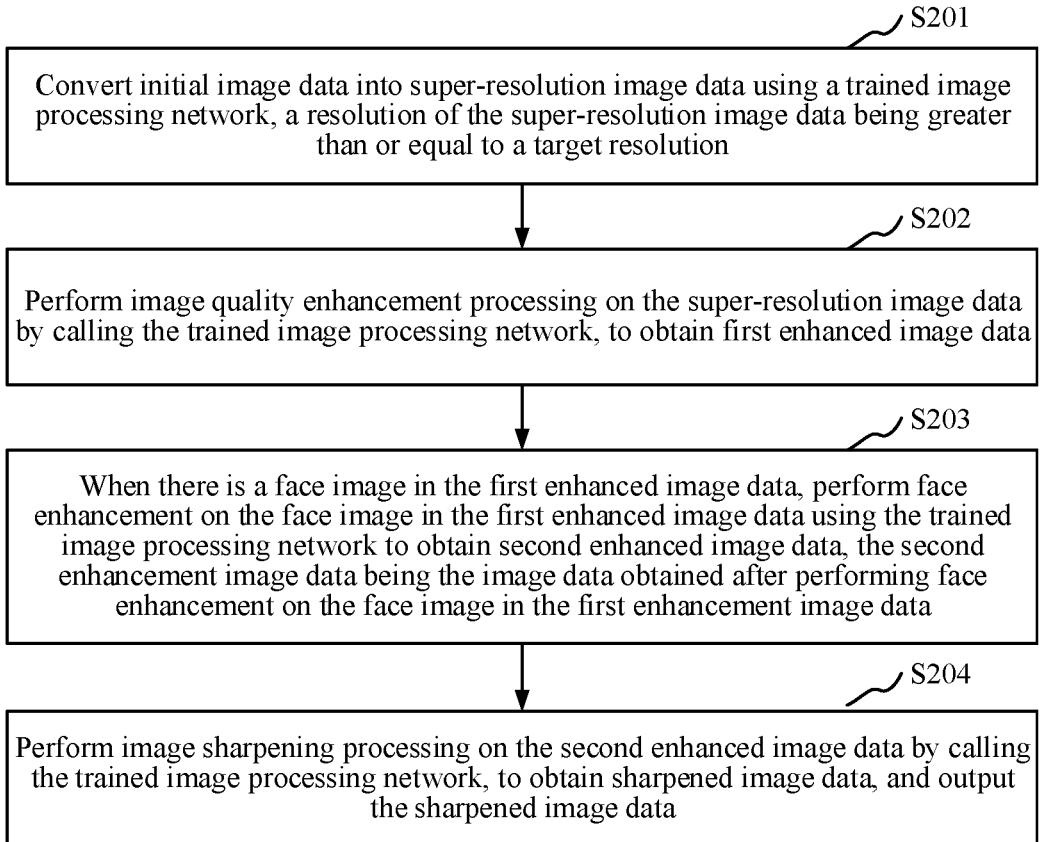

S201

Convert initial image data into super-resolution image data using a trained image processing network, a resolution of the super-resolution image data being greater than or equal to a target resolution

S202

Perform image quality enhancement processing on the super-resolution image data by calling the trained image processing network, to obtain first enhanced image data

S203

When there is a face image in the first enhanced image data, perform face enhancement on the face image in the first enhanced image data using the trained image processing network to obtain second enhanced image data, the second enhancement image data being the image data obtained after performing face enhancement on the face image in the first enhancement image data

S204

Perform image sharpening processing on the second enhanced image data by calling the trained image processing network, to obtain sharpened image data, and output the sharpened image data

TRAINING METHOD AND APPARATUS FOR IMAGE PROCESSING NETWORK, COMPUTER DEVICE, AND STORAGE MEDIUM

CROSS-REFERENCE TO RELATED APPLICATIONS

This application is a continuation application of PCT Patent Application No. PCT/CN2022/117789, entitled "TRAINING METHOD AND APPARATUS FOR IMAGE PROCESSING NETWORK, COMPUTER DEVICE, AND STORAGE MEDIUM" filed on Sep. 8, 2022, which claims priority to Chinese Patent Application No. 202111188444.9, entitled "TRAINING METHOD AND APPARATUS FOR IMAGE PROCESSING NETWORK, COMPUTER DEVICE, AND STORAGE MEDIUM" filed with the Chinese Patent Office on Oct. 12, 2021, all of which is incorporated by reference in its entirety.

TECHNICAL FIELD

The present disclosure relates to the technical field of image processing, and in particular to a training method and apparatus for an image processing network, a computer device, and a storage medium.

BACKGROUND

As computer network technologies advance, image optimization has been applied to a growing number of scenes, such as a scene in which a photo of a user needs to be optimized, or image frames in video data need to be optimized. The image optimization can be carried out by training image models.

In the related art, a plurality of image models with different optimization tasks are separately trained. Through the plurality of trained image models, an image is processed in a superimposed optimization manner. However, in this case, one image model may have a reverse optimization effect on another one. As a result, the optimization effects of the image models are mutually weakened, thereby reducing the image optimization effects of the trained image models.

SUMMARY

According to another aspect of the present disclosure, an image processing method is performed by a computer device, which includes:

converting initial image data into super-resolution image data using a trained image processing network, a resolution of the super-resolution image data being greater than or equal to a target resolution;

performing image quality enhancement processing on the super-resolution image data using the trained image processing network, to obtain first enhanced image data;

when there is a face image in the first enhanced image data, performing face enhancement on the face image in the first enhanced image data using the trained image processing network to obtain second enhanced image data; and performing image sharpening processing on the second enhanced image data using the trained image processing network to obtain sharpened image data.

According to another aspect of the present disclosure, a computer device is provided, which includes a memory and a processor, the memory storing computer-readable instructions, and the computer-readable instructions, when being executed by the processor, causing the computer device to perform the method according to any one of foregoing aspects of the present disclosure.

According to yet another aspect of the present disclosure, a non-transitory computer-readable storage medium is provided, which stores computer-readable instructions, and the computer-readable instructions, when being executed by a processor of a computer device, causing the computer device to perform the method according to any one of the foregoing aspects of the present disclosure.

BRIEF DESCRIPTION OF THE DRAWINGS

To describe the technical solutions in the embodiments of the present disclosure or in the prior art more clearly, the following briefly introduces the accompanying drawings for describing the embodiments or the prior art. Apparently, the accompanying drawings in the following description show merely some embodiments of the present disclosure, and a person of ordinary skill in the art may still derive other drawings from the accompanying drawings without creative efforts.

FIG. 3 is a schematic flowchart of a training method for an image processing network according to an embodiment of the present disclosure.

FIG. 7 is a schematic flowchart of an image processing method according to an embodiment of the present disclosure.

DETAILED DESCRIPTION

The technical solutions in embodiments of the present disclosure are clearly and completely described in the following with reference to the accompanying drawings in the embodiments of the present disclosure. Apparently, the described embodiments are merely some rather than all of the embodiments of the present disclosure. All other embodiments obtained by a person of ordinary skill in the art based on the embodiments of the present disclosure without making creative efforts shall fall within the protection scope of the present disclosure.

Figure 1:
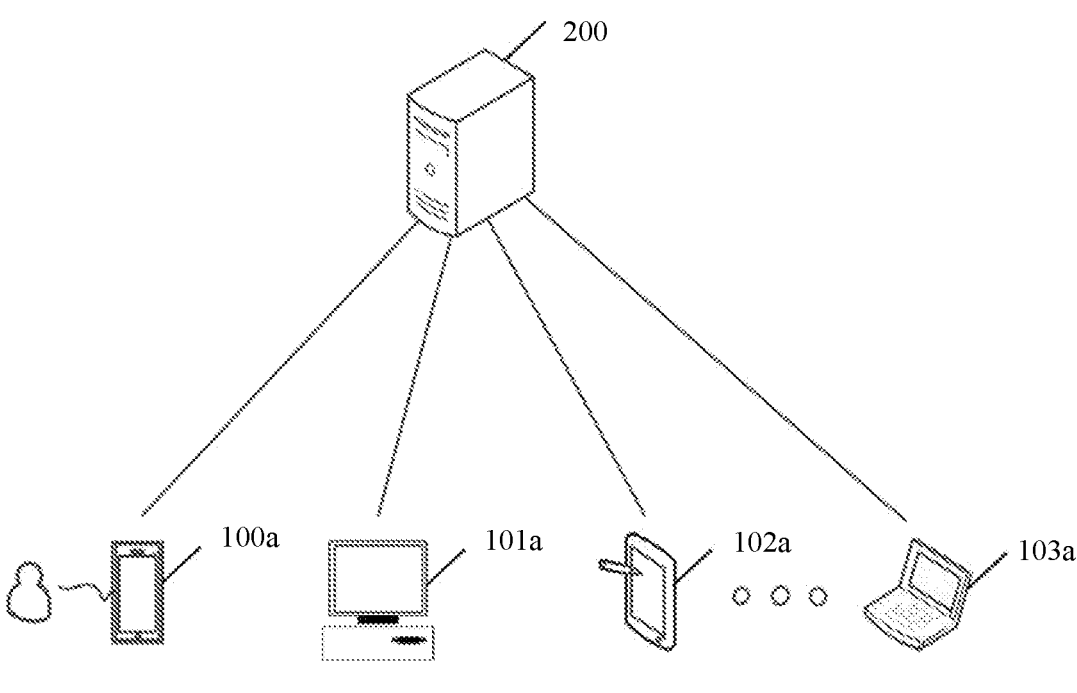
FIG. 1 is a schematic structural diagram of a network architecture according to an embodiment of the present disclosure.

Referring to FIG. 1, FIG. 1 is a schematic structural diagram of a network architecture according to an embodiment of the present disclosure. As shown in FIG. 1, the network architecture may include a server 200 and a terminal device cluster. The terminal device cluster may include one or a plurality of terminal devices. The quantity of the terminal devices is not limited in the present disclosure. As shown in FIG. 1, the plurality of terminal devices may specifically include a terminal device 100a, a terminal device 101a, a terminal device 102a, . . . , and a terminal device 103a. As shown in FIG. 1, the terminal device 100a, the terminal device 101a, the terminal device 102a, . . . , and the terminal device 103a may be connected to the server 200 via a network, so that each terminal device can perform data interaction with the server 200 through the network connection.

The server 200 as shown in FIG. 1 may be an independent physical server, or may be a server cluster or a distributed system including a plurality of physical servers, or may be a cloud server providing cloud service, cloud database, cloud computing, cloud function, cloud storage, network service, cloud communication, middleware service, domain name service, security service, content delivery network (CDN), and big data and artificial intelligence platform and other basic cloud computing service. The terminal device may be an intelligent terminal, such as a smart phone, a tablet computer, a notebook computer, a desktop computer, a smart television, or a vehicle-mounted terminal. The embodiments of the present disclosure are specifically described below with the communication between terminal device 100a and the server 200 as an example.

Figure 2:
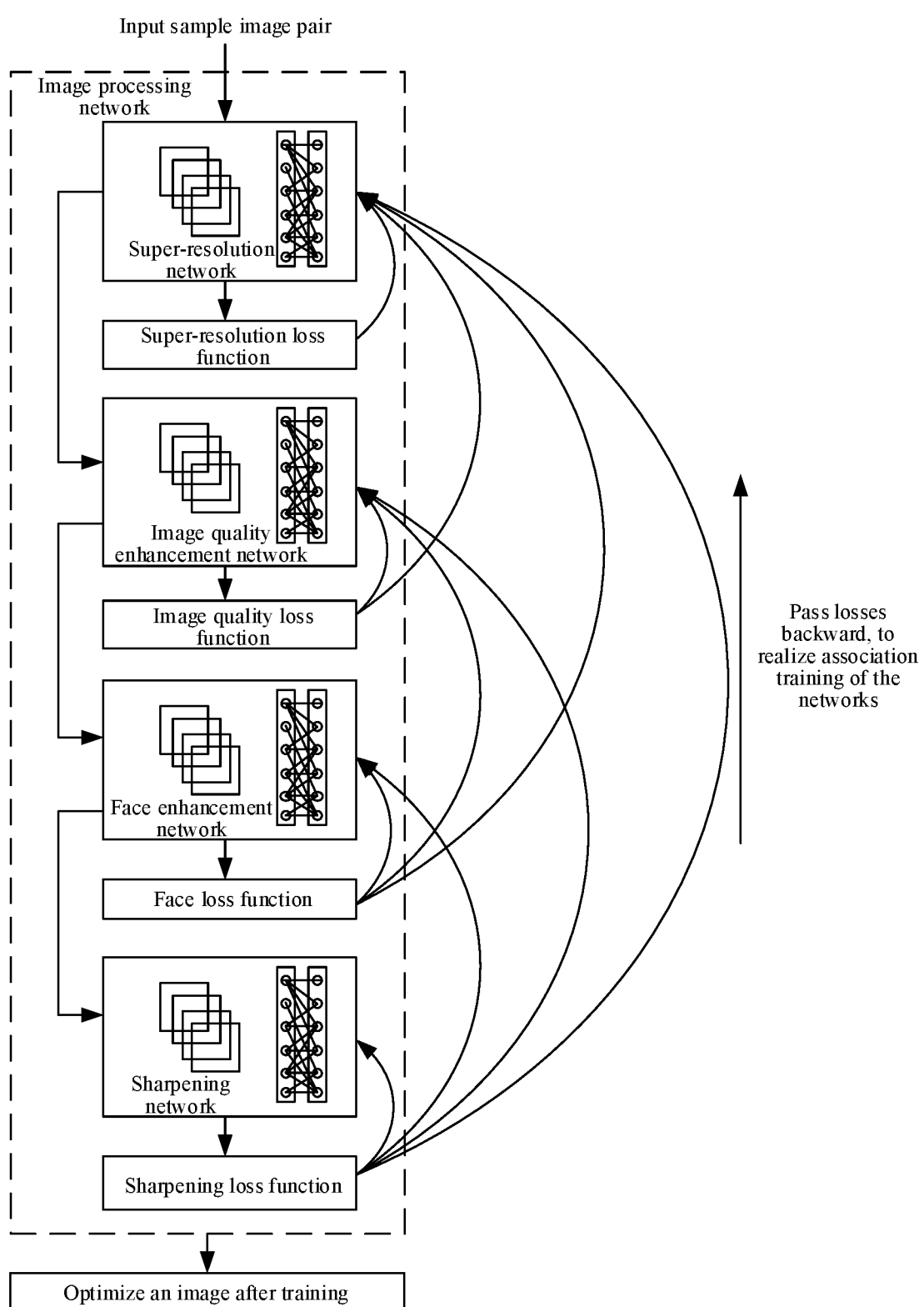
FIG. 2 is a schematic scenario diagram of network training according to an embodiment of the present disclosure.

With reference to FIG. 2, FIG. 2 is a schematic scenario diagram of network training according to the present disclosure. The terminal device 100a may have an application client, and the server 200 may be a back-end server of the application client. The server 200 may push video data to the application client. However, when pushing video data to the application client, the server 200 may optimize the video data and then push the video data to the application client. Video data optimization may refer to optimizing each image frame in the video data. The server 200 may optimize the image frames in the video data by using a trained image processing network, whose training process is described below.

The image processing network that needs to be trained may include a super-resolution network, an image quality enhancement network, a face enhancement network, and a sharpening network. The server 200 may obtain a sample image pair, which may include low-definition image data and high-definition image data. The server 200 may input the sample image pair into an image processing network. First, the super-resolution network in the image processing network performs super-resolution processing (namely, improving the resolution of the low-resolution image data) on the low-resolution image data, to obtain sample super-resolution image data. Then, a super-resolution loss function is generated according to the sample super-resolution image data and the high-definition image data.

Next, the image quality enhancement network in the image processing network performs image quality enhancement processing on the sample super-resolution image data, to obtain first sample enhanced image data. An image quality loss function is generated according to the first sample enhanced image data and the high-definition image data.

Then, the face enhancement network in the image processing network performs face enhancement on a face image in the first sample enhanced image data, to obtain a sample enhanced face image. A face loss function is generated according to the sample enhanced face image and a high-definition face image in the high-definition image data. The sample enhanced face image is fused with the first sample enhanced image data, to generate second sample enhanced image data. The specific process may refer to the corresponding description in the embodiment corresponding to FIG. 3.

Finally, the sharpening network in the image processing network performs sharpening processing on the second sample enhanced image data, to obtain sample sharpened image data. A sharpening loss function is generated according to the sample sharpened image data and the high-definition image data.

The server 200 may pass backward the generated super-resolution loss function, the image quality loss function, the face loss function, and the sharpening loss function in the image processing network, and then update network parameters of the networks that have been passed to in the image processing network according to the super-resolution loss function, the image quality loss function, the face loss function, and the sharpening loss function, to obtain the trained image processing network. The trained image processing network can be configured to optimize an image, such as, the initial image data described below. The specific optimization process may refer to the related description in the embodiment corresponding to FIG. 7.

In the related art, during the image model training, a plurality of image models with different optimization tasks (such as an image processing task for improving image resolution, an image processing task for enhancing image quality, an image processing task for improving face enhancement effect, and the like) are trained separately, so that the plurality of image models are obtained through independent training. The optimization processing is performed on the image by the plurality of image models that are independent of each other. However, different tasks may conflict with each other. For example, an image is processed by one image model, with its corresponding effect improved, and then is processed by another image model, but with the overall effect getting worse. That is, the image processing tasks of the two image models conflict with each other. This phenomenon is called destructive interference. For example, the image model for enhancing the image resolution is used to optimize an image so as to enhance the resolution of the image, and the image model for enhancing the image quality is used to optimize the image so as to enhance the image quality of the image. However, if there is distortion in the image that is obtained by the image model for enhancing the image quality performs superimposing processing on the image whose resolution has been enhanced, resulting in poor overall image effect, this shows that there is a conflict between the image processing tasks of the two image models.

The model training method according to the embodiments of the present disclosure provides a multi-task joint training framework including the super-resolution network, the image quality enhancement network, the face enhancement network, and the sharpening network. In the joint training framework, the super-resolution network, the image quality enhancement network, the face enhancement network, and the sharpening network are cascaded sequentially. During the training process, the super-resolution network obtains the super-resolution loss function according to the inputted sample image pair and its own output. Each of the other networks except the super-resolution network obtains, according to the output of the previous network (namely the input of the current network) and the output of the current network, the image quality loss function, the face loss function, and the sharpening loss function in turn. Each loss function includes its own network parameter. Since each loss function can be passed backward in the whole network, the network parameters of these networks can be mutually constrained and influenced, and then the network parameters of the networks that have been passed to (such as the super-resolution network, the image quality enhancement network, the face enhancement network, and the sharpening network) can be updated. In this way, the super-resolution network, the image quality enhancement network, the face enhancement network, and the sharpening network can be trained in a manner of mutual association, mutual integration, and mutual promotion. As a result, each of the super-resolution network, the image quality enhancement network, the face enhancement network, and the sharpening network is trained with good effect, and there is no conflict when these networks perform superimposed optimization on the image, thereby improving the overall optimization effect.

Referring to FIG. 3, FIG. 3 is a schematic flowchart of a training method for an image processing network according to an embodiment of the present disclosure. The execution body in this embodiment of the present disclosure may be a computer device or a computer device cluster including a plurality of computer devices. The computer device may be a server or a terminal device. Therefore, the execution body in the embodiment of the present disclosure may be a server, or a terminal device, or a combination of a server and a terminal device. This embodiment is described in detail by using an example in which the execution body is a server. As shown in FIG. 3, the method may include:

Step S101. Obtain a sample image pair. The sample image pair includes low-definition image data and high-definition image data. The low-definition image data has the same image content as the high-definition image data.

In the present disclosure, the server may obtain the sample image pair, which is used for training the image processing network. One sample image pair may include one piece of low-definition image data and one piece of high-definition image data corresponding to the piece of low-definition image data. Since the process of training the image processing network using each sample image pair has the similar principle, the process in which the image processing network is trained using one sample image pair (collectively called the sample image pair) is described below as an example.

The low-definition image data and the high-definition image data included in the sample image pair are the images that have the same image content but different image definitions (briefly called definitions). The definition of the low-definition image data is lower than that of the high-definition image data. The resolution of the low-definition image data is less than a target resolution, and the resolution of the high-definition image data is greater than or equal to the target resolution. The target resolution may be set according to an actual application scenario, for example, the target resolution may be 1920*1080.

In the embodiments of the present disclosure, the sample image pair is obtained in one or more of the following ways.

In an embodiment, the server may obtain high-definition sample video data. The sample video data is the video data used for obtaining the sample image pair. Since one piece of video data may include a plurality of image frames, the high-definition sample video data may be the video data in which the image frames have the definitions greater than a definition threshold. The definition threshold may be set according to an actual application scenario. In addition, the sample video data may be the video data in which the image frames have the resolutions greater than the target resolution.

Therefore, the server may segment the sample video data into frames, to obtain the plurality of image frames included in the sample video data. The image frames included in the sample video data may be called sample image frames. The server may perform encoding and decoding processing (namely, encoding and then decoding) on the sample video data at a target bit rate (a low bit rate). The video data obtained after the encoding and decoding processing may be called low-quality video data. The image frame quality of the low-quality video data is lower than the image frame quality of the sample video data. That is, the definition of the image frames in the low-quality video data is lower than the definitions of the image frames in the sample video data. The target bit rate may be lower than a bit rate threshold. The bit rate threshold may be set according to an actual application scenario, and may be a relatively low bit rate. Therefore, after performing the encoding and decoding processing on the sample video data at the target bit rate, the image quality of the obtained low-quality video data becomes worse, so that the definitions of the image frames in the low-quality video data become lower.

The image frames in the low-quality video data may be called low-quality image frames. The low-quality video data may include the low-quality image frames that correspond to the sample image frames. One sample image frame corresponds to one low-quality image frame. Since the encoding and decoding processing does not change the resolutions of the image frames, the obtained low-quality image frames are actually high-resolution image frames. Therefore, the resolution of each low-quality image frame in the low-quality video data may be reduced, for example, lower than the target resolution. The low-quality image frames whose resolutions have been reduced may be called low-resolution image frames. Therefore, the server may construct the sample image pair according to each sample image frame and the low-resolution image frame to which the corresponding low-quality image frame belongs. One sample image pair may include one sample image frame and one low-resolution image frame (namely the image frame obtained after the resolution of the low-quality image frame corresponding to the sample image frame is reduced) corresponding to the sample image frame. The sample image frame included in one sample image pair is one piece of high-definition image data, and the low-resolution image data included in one sample image pair is one piece of low-definition image data. Therefore, a plurality of sample image pairs can be obtained using the foregoing sample video data.

In an embodiment, similarly, the server may obtain sample video data, and segment the sample video data, to obtain a plurality of sample image frames included in the sample video data. The server may select a target image frame from the plurality of sample image frames as the high-definition image data. The server may perform average fusion processing on the target image frame and the adjacent image frames of the target image frame in the plurality of sample image frames. The image frame obtained after the average fusion processing may be called an average image frame. The server may reduce the resolution of the average image frame (for example, lower than the target resolution), to obtain the low-definition image data. One target image frame may be any image frame among the plurality of image frames included in the sample video data. One target image frame may be one piece of high-definition image data. There may be a plurality of target image frames. The adjacent image frames of the target image frame may include one or more image frames to the left of the target image frame and one or more image frames to the right of the target image frame among the plurality of sample image frames. The quantity of the adjacent image frames of the target image frame is determined according to an actual application scenario, which is not limited in the present disclosure.

In an embodiment, the server may directly obtain the high-definition image data. For example, the high-definition image data is downloaded from a web-page, or is local high-definition image data. The server may perform Gaussian blur processing on the high-definition image data, and reduce the resolution (for example, lower than the target resolution) of the image frame that has undergone the Gaussian blur processing, to obtain the low-definition image data corresponding to the high-definition image data. The Gaussian blur is also called Gaussian smoothing.

In an embodiment, the server may directly obtain the high-definition image data, perform distortion format conversion on the high-definition image data, and reduce the resolution (for example, lower than the target resolution) of the image frame that has undergone the distortion format conversion, to obtain the low-definition image data corresponding to the high-definition image data. For example, the distortion format conversion on the high-definition image data may be understood as compressing the high-definition image data, and the image quality of the image frame obtained after being compressed is lower than that of the high-definition image data. For example, the distortion format conversion on the high-definition image data may be converting the data format of the high-definition image data from PNG (a lossless compressed image format) to JPG (a lossy compressed image format).

In an embodiment, the server may directly obtain the high-definition image data. In addition, the server may obtain sample low-quality video data. The sample low-quality video data may be the video data that includes the image frames whose definitions are lower than the definition threshold. Therefore, the server may learn noise data of the sample low-quality video data by means of machine learning, and fuse the noise data in the high-definition image data, and then reduce the resolution of the high-definition image data that has been fused with the noise data, to obtain the low-definition image data. The way to fuse the noise data in the high-definition image data may be adding the noise data into the high-definition image data. The process in which the server learns the noise data of the sample low-quality video data by means of machine learning may be that the server obtains a noise learning network, which is the model capable of learning noise data in video data. Therefore, the server may input the sample low-quality video data into the noise learning network, so as to learn the noise data of the sample low-quality video data by the noise learning network.

After obtaining the high-definition image data and the low-definition image data, the sample image pair is constructed using the high-definition image data and the low-definition image data.

The constructed sample image pair is used for training the image processing network. The image processing network may include the super-resolution network, the image quality enhancement network, the face enhancement network, and the sharpening network.

Each generative network (such as the super-resolution network, the image quality enhancement network, and the face enhancement network) of the image processing network may have a U-Net architecture (a type of network architecture) based on an encoder-decoder scheme. Each generative network may be consisted of basic units (blocks). The encoder and decoder of the super-resolution network may have 3 blocks (that is, one layer in the encoder and decoder has 3 blocks). The image quality enhancement network and the face enhancement network each may have 5 blocks (that is, one layer in the encoder and decoder has 5 blocks). The number of basic channels in each block may be 16. In addition, in the present disclosure, the first 3×3 convolution inside the block is subjected to channel amplification, thereby improving the feature dimension. Further, the outputted 3×3 convolution is subjected to feature compression, thereby keeping the dimension the same as the inputted channel dimension. In this way, more feature information of the image can be learned.

In addition, in the present disclosure, when super-resolution processing is performed on the image in the super-resolution network, the PixelShuffle (an up-sampling technique) may be used as an up-sampling operation. The interpolation up-sampling scheme is replaced by the dimension conversion from channel to space, which can achieve a better visual effect.

According to the present disclosure, the sample image pairs are obtained in various ways, which makes the types of the obtained sample image pairs more abundant. The various types of sample image pairs are then used to train the image processing network, thereby improving the training effect on the image processing network. The details may refer to the following description.

Figure 4:
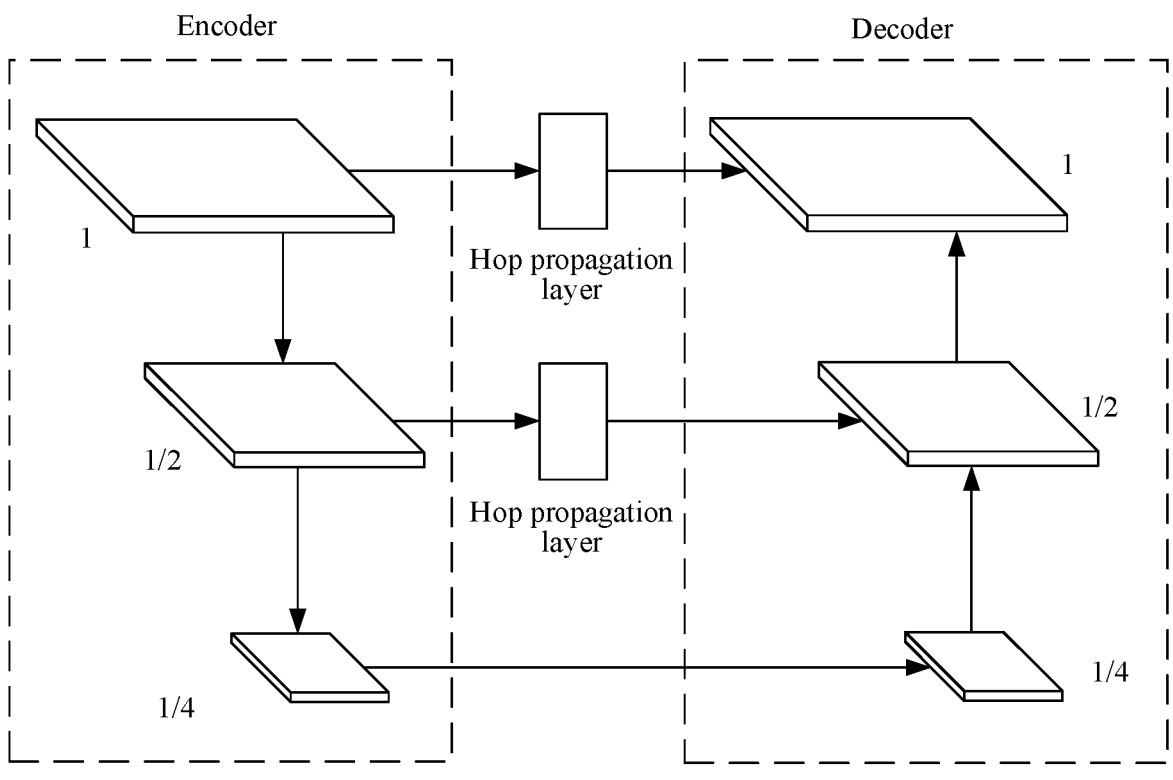
FIG. 4 is a schematic structural diagram of an encoder-decoder network according to an embodiment of the present disclosure.
Figure 5:
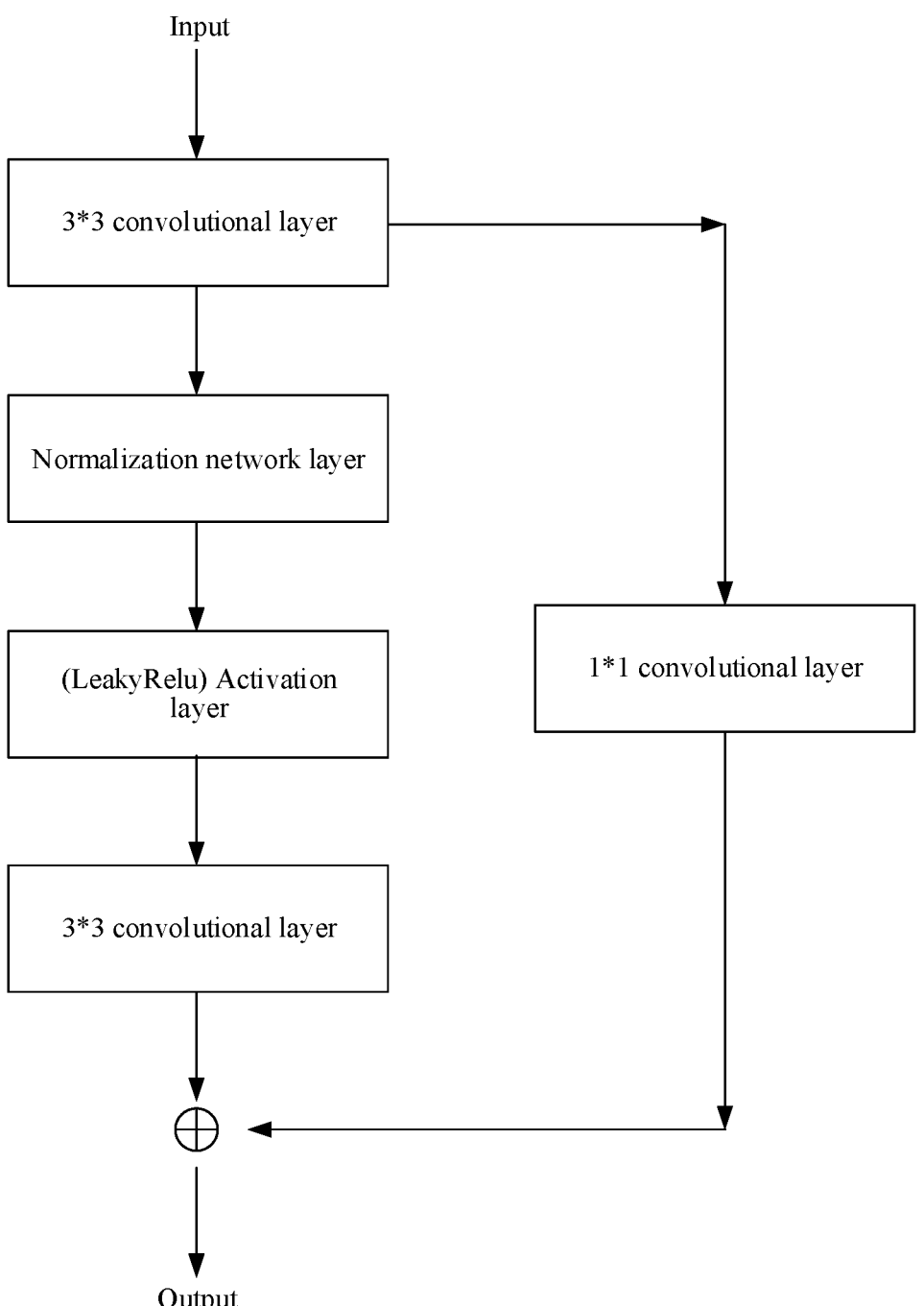
FIG. 5 is a schematic structural diagram of a basic unit according to an embodiment of the present disclosure.

Referring to FIG. 4 and FIG. 5, FIG. 4 is a schematic structural diagram of an encoder-decoder network according to the present disclosure, and FIG. 5 is a schematic structural diagram of a basic unit according to the present disclosure. The super-resolution network, the image quality enhancement network, and the face enhancement network each may have the network architecture as shown in FIG. 4. This network architecture includes an encoder and a decoder. The encoder may have 3 layers, and the decoder may have 3 layers. Each layer of the encoder and the decoder may be formed by the basic unit as shown in FIG. 5. One basic unit may sequentially include a 3*3 convolution layer, a normalization network layer, an activation layer (namely LeakyRelu), a 3*3 convolution layer, and a 1*1 convolution layer.

Step S102. Call the image processing network to adjust a resolution of the low-definition image data to a target resolution, to obtain sample super-resolution image data, and generate a super-resolution loss function according to the sample super-resolution image data and the high-definition image data.

In the present disclosure, the server may call the super-resolution network in the image processing network to increase the resolution of the low-definition image data, for example, to the target resolution, so as to generate the sample super-resolution image data corresponding to the low-definition image data. The sample super-resolution image data is the image data obtained after the resolution of the low-definition image data is increased to the target resolution by the super-resolution network.

Then, the server may generate the super-resolution loss function according to the sample super-resolution image data and the high-definition image data, the specific process of which is described below.

The super-resolution loss function may include two parts, one of which is a loss function at a pixel level, and the other one of which is a loss function at a feature level. The loss function at the pixel level and the loss function at the feature level are combined to constrain the super-resolution effect, thereby improving the super-resolution training effect.

The loss function at the pixel level may be called a first super-resolution loss function, and the loss function at the feature level may be called a second super-resolution loss function.

The server may generate the first super-resolution loss function according to pixel value elements included in the sample super-resolution image data and pixel value elements included in the high-definition image data. The first super-resolution loss function $l_{c1}$ may be expressed in the following formula (1):

$$l_{c1} = \sum_{i=0}^{N} \left| I^{(i)} - \hat{I}_{(1)}^{i} \right| \qquad (1)$$

The sample super-resolution image data and the high-definition image data include the same number of pixel points, both of which are N. The pixel value at a pixel point may be called a pixel value element. I represents the high-definition image data, $\hat{I}_1$ represents the sample super-resolution image data, and $I^{(i)}$ represents the i-th pixel value element in the high-definition image data, $$\hat{I}_{(1)}^{i}$$

represents the i-th pixel value element in the sample super-resolution image data, i is counted from 0, i is less than or equal to N, and N is the total number of the pixel value elements in the image data.

The server may generate the second super-resolution loss function according to feature value elements included in feature maps of the sample super-resolution image data in the super-resolution network and feature value elements included in feature maps of the high-definition image data in the super-resolution network. The second super-resolution loss function $l_{c2}$ may be expressed in the following formula (2):

$$l_{c2} = \frac{1}{h_l w_l c_l} \sqrt{\sum_{s_1, j_1, k_1} \left( \phi_{s_1, j_1, k_1}^{(l)}(\hat{I}_1) - \phi_{s_1, j_1, k_1}^{(l)}(I) \right)^2} \qquad (2)$$

Where the value of l is determined according to an actual application scenario, l represents the number of feature layers, $h_l$ represents the height of the feature map of the l-th feature layer in the super-resolution network, $w_l$ represents the width of the feature map of the l-th feature layer, $c_l$ represents the channel number of the l-th feature layer, $s_1$ corresponds to the height of the feature map, the maximum value of $s_1$ is equal to $h_l$, $j_1$ corresponds to the width of the feature map, the maximum value of $j_1$ is equal to $w_l$, $k_1$ corresponds to the channel of the feature map, the maximum value of $k_1$ is equal to $c_l$. The value at each feature point in a feature map may be called the feature value element. Therefore, $s_1$, $j_1$, and $k_1$ may be understood as an index for a feature value element in the feature map. $\phi$ represents an operation of extracting a feature value element at a corresponding position in a feature map.

In addition, $\phi_{s_1, j_1, k_1}^{(l)}(\hat{I}_1)$ represents the feature value element at the height of $s_1$ and the width of $j_1$ in the feature map (in the super-resolution network) of the $k_1$-th channel of the l-th feature layer of the sample super-resolution image data $\hat{I}_1$; and $$\phi_{s_1, j_1, k_1}^{(l)}(I)$$

represents the feature value element at the height of $s_1$ and the width of $j_1$ in the feature map (in the super-resolution network) of the $k_1$-th channel of the l-th feature layer of the high-definition image data I.

Therefore, the super-resolution loss function is the sum of the first super-resolution loss function $l_{c1}$ and the second super-resolution loss function $l_{c2}$.

Step S103. Call the image processing network to perform image quality enhancement processing on the sample super-resolution image data, to obtain first sample enhanced image data, and generate an image quality loss function according to the first sample enhanced image data and the high-definition image data.

In the present disclosure, the sample super-resolution image data obtained from the super-resolution image may be the input of the image quality enhancement network. The server may call the image quality enhancement network in the image processing network to perform image quality enhancement processing on the sample super-resolution image data, so as to generate the first sample enhanced image data corresponding to the sample super-resolution image data. The first sample enhanced image data is the image data obtained by performing image quality enhancement processing on the sample super-resolution image data.

Further, the server may use the peak signal-to-noise ratio (PSNR) obtained according to the mean squared error between the first sample enhanced image data and the high-definition image data as the image quality loss function. The image quality loss function $PSNR_h$ may be expressed in the following formula (3):

$$PSNR_h = -10\log_{10} \frac{2^{bits} - 1}{MSE(I, \hat{I}_2)} \qquad (3)$$

Where I represents the high-definition image data, $\hat{I}_2$ represents the first sample enhanced image data, $MSE(I, \hat{I}_2)$ represents the mean squared error between the high-definition image data and the first sample enhanced image data, and bits represents the precision, which may be that the number of bits in binary is 16 or the number of bits in binary is 32.

Step S104. Call the image processing network to perform face enhancement processing on a face image in the first sample enhanced image data, to obtain sample enhanced face image, fuse the sample enhanced face image and the first sample enhanced image data, to obtain second sample enhanced image data, and generate a face loss function according to the sample enhanced face image and a face image in the high-definition image data.

In the present disclosure, the first sample enhanced image data obtained by the image quality enhancement network may be used as the input of the face enhancement network. There may be a face image included in the first sample enhanced image data. The server may further call the face enhancement network in the image processing network to perform face enhancement processing on the face image in the first sample enhanced image data, to generate the second sample enhanced image data. The second sample enhanced image data is the image data obtained after performing face enhancement processing on the face image in the first sample enhanced image data. The details may refer to the following description.

The face enhancement network may include a face detection network, a face enhancement sub-network, and a face fusion network. The face enhancement sub-network may include a color discrimination network and a texture discrimination network. The server may call the face detection network to detect a detection box where the face image in the first sample enhanced image data is located. The detection box may be called a face detection box. The first sample enhanced image data may be further labeled with a label box for indicating the actual position of the face image in the first sample enhanced image data. The label box may be called a face label box. The server may cut out the face image in the face detection box from the first sample enhanced image data, to obtain the detected face image. Further, the server may call the face enhancement sub-network to perform face enhancement processing on the detected face image (namely the face image cut out from the first sample enhanced image data), to obtain the enhanced face image. The enhanced face image may be called the sample enhanced face image. The sample enhanced face image is the face image obtained after performing face enhancement processing on the face image in the first sample enhanced image data. The server may call the face fusion network to fuse the sample enhanced face image with the first sample enhanced image data, and the image data obtained through fusion may be called the second sample enhanced image data.

Therefore, the server may generate the detection loss function according to the face detection box and the face label box. As the name implies, the detection loss function is caused by the deviation between the detected position of the face image in the first sample enhanced image data and the actual position of the face image. The detection loss function $l_{r1}$ may be expressed in the following formula (4):

$$l_{r1} = 1 - \frac{2|J \cap \hat{J}|}{|J| + |\hat{J}|} \tag{4}$$

Where J may be the face label box, $\hat{J}$ may be the face detection box, $|J \cap \hat{J}|$ may represent the area of intersection between the face label box and the face detection box, $|J|$ may represent the area of the face label box, and $|\hat{J}|$ may represent the area of the face detection box.

In addition, the server may cut out the face image from the high-definition image data, to obtain the face image in the high-definition image data. The face image cut out from the high-definition image data may be called the high-definition face image.

The server may generate, by the color discriminator, a color loss function according to the high-definition face image and the sample enhanced face image. The color loss function is used for characterizing the difference between the color of the sample enhanced face image and the color of the high-definition face image. For example, the color discriminator discriminates the probability that the color of the sample enhanced face image is the color of the high-definition face image, and this probability is used for representing the color loss function. The goal is to make this probability close to 0.5, indicating that the color discriminator fails to distinguish the color of the sample enhanced face image and the color of the high-definition face image at this time. In this case, the expected effect is achieved.

The server may perform Gaussian blur processing on the high-definition face image and the sample enhanced face image respectively, and then determine the probability that the color of the sample enhanced face image after Gaussian blur processing is the color of the high-definition face image after Gaussian blur processing. This probability is used for characterizing the color loss function.

The server may generate, by the texture discriminator, a texture loss function according to the high-definition face image and the sample enhanced face image. The texture loss function is used for characterizing the difference between the texture of the enhanced sample enhanced face image and the texture of the high-definition face image. For example, the texture discriminator determines the probability that the texture of the sample enhanced face image is the texture of the high-definition face image, and this probability is used for characterizing the texture loss function. The goal is to make this probability close to 0.5, indicating that the texture discriminator fails to distinguish the texture of the sample enhanced face image and the texture of the high-definition face image at this time. In this case, the expected effect is achieved.

The server may perform grayscale processing on the high-definition face image and the sample enhanced face image respectively, and then determine the probability that the texture of the gray-scaled sample enhanced face image is the texture of the gray-scale high-definition face image. This probability characterizes the texture loss function.

Moreover, the server may generate a content loss function according to the feature value elements included in the feature maps of the sample enhanced face image and the feature value elements included in the feature maps of the high-definition face image. The content loss function is used to characterize the content difference between the second sample enhanced image data and the high-definition image data. The content loss function $I_{r2}$ may be expressed in the following formula (5):

$$l_{r2} = \frac{1}{h_t w_t c_t} \sqrt{\sum_{s_2, j_2, k_2} \left( \phi_{s_2, j_2, k_2}^{(t)}(\hat{R}) - \phi_{s_2, j_2, k_2}^{(t)}(R) \right)^2} \tag{5}$$

Where R is the high-definition face image, $\hat{R}$ is the sample enhanced face image, the value of t is determined according to an actual application scenario, t represents the number of feature layers, $h_t$ represents the height of the feature map of the t-th feature layer in the face enhancement sub-network, $w_t$ represents the width of the feature map of the t-th feature layer, $c_t$ represents the channel number of the t-th feature layer, $s_2$ corresponds to the height of the feature map, the maximum value of $s_2$ is equal to $h_t$, $j_2$ corresponds to the width of the feature map, the maximum value of $j_2$ is equal to $w_t$, $k_2$ corresponds to the channel of the feature map, the maximum value of $k_2$ is equal to $c_t$. The value at each feature point in a feature map may be called a feature value element. Therefore, $s_2$, $j_2$, and $k_2$ may be understood as indexes for a feature value element in the feature map. $\phi$ represents the operation of extracting a feature value element at a corresponding position in a feature map.

In addition,

US 12,626,328 B2

13

$$\phi^{(t)}_{s_2,j_2,k_2}(\hat{R})$$

represents the feature element value at the height of $s_2$ and the width of $j_2$ in the feature map of the $k_2$-th channel of the t-th feature layer in the sample enhanced face image $\hat{R}$; and $$\phi^{(t)}_{s_2,j_2,k_2}(R)$$

represents the feature element value at the height of $s_2$ and the width of $j_2$ in the feature map of the $k_2$-th channel of the t-th feature layer in the high-definition face image R.

Therefore, the face loss function may be the sum of the detection loss function $l_{r1}$, the color loss function, the texture loss function, and the content loss function $l_{r2}$.

From the above, the detection loss function can be obtained by the face detection network. The color loss function, the texture loss function, and the content loss function can be obtained by the face enhancement sub-network. The face loss function is the sum of the detection loss function, the color loss function, the texture loss function, and the content loss function.

In some embodiments, in addition to using the face image that is cut out from the first sample enhanced image data for training, the face enhancement network may use the face image that is not cut out from the first sample enhanced image data for training. The face enhancement network is trained by combining two types of face images (images of one type are to-be-trained face images (which are not cut out from the first sample enhanced image data) in a training set (any training set including to-be-optimized face images), and images of the other type are face images in the first sample enhanced image data obtained by the image quality enhancement network), thereby improving the training effect.

Step S105. Call the image processing network to perform image sharpening processing on the second sample enhanced image data, to obtain sample sharpened image data, and generate a sharpening loss function according to the sample sharpened image data and the high-definition image data.

In the present disclosure, the second sample enhanced image data may be used as the input of the sharpening network. The server may call the sharpening network in the image processing network to perform image sharpening processing on the second sample enhanced image data, to obtain the image data after performing image sharpening processing on the second sample enhanced image data. This image data may be called the sample sharpened image data.

The server may generate a loss function of the sharpening network according to the sample sharpened image data and the high-definition image data. This loss function may be called the sharpening loss function. The sharpening loss function may include two parts, one of which is a loss function in the objective perspective, and the other one of which is a loss function in the sensory perspective. The loss function in the objective perspective may be called a mass loss function, and the loss function in the sensory perspective may be called a perceptual loss function.

The mass loss function may be the PSNR between the sample sharpened image data and the high-definition image data, and the perceptual loss function is obtained by a perceptual similarity between the sample sharpened image data and the high-definition image data. The perceptual similarity may be obtained according to the learned perceptual image patch similarity (LPIPS) between the sample sharpened image data and the high-definition image data. The smaller the LPIPS, the more similar the sample sharpened image data and the high-definition image data in the sensory level; and vice versa, the greater the LPIPS, the less similar (namely greater difference) the sample sharpened image data and the high-definition image data in the sensory level. Therefore, the perceptual loss function aims to minimize the LPIPS between the sample sharpened image data and the high-definition image data.

Therefore, the sharpening loss function may be the sum of the mass loss function and the perceptual loss function.

Figure 6:
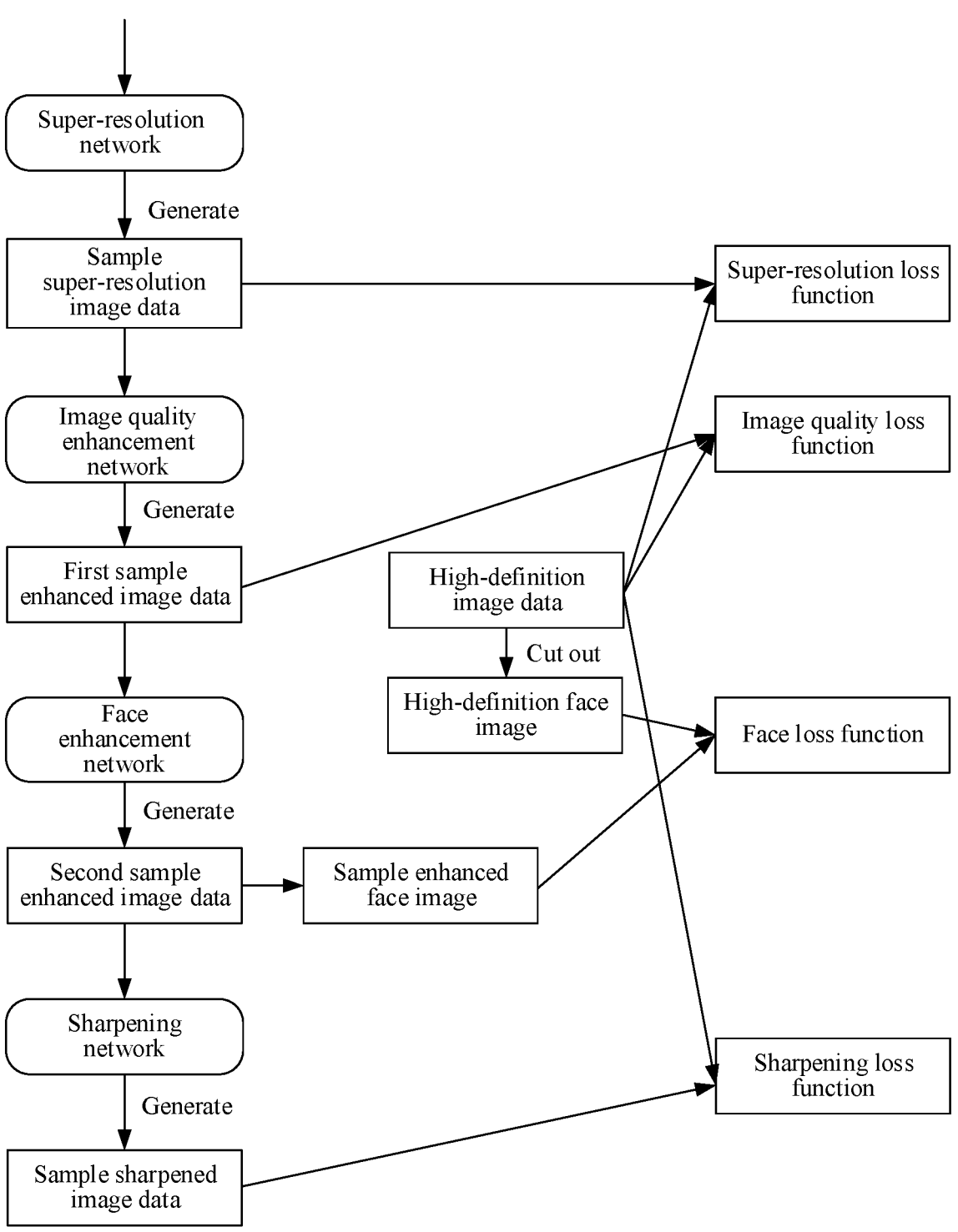
FIG. 6 is a schematic scenario diagram of obtaining loss functions according to the present disclosure.

Referring to FIG. 6, FIG. 6 is a schematic scenario diagram of obtaining the loss functions according to an embodiment of the present disclosure. As shown in FIG. 6, the server may input the sample image pair into the super-resolution network. The sample super-resolution image data corresponding to the low-definition image data is generated in the super-resolution network. The super-resolution loss function is generated according to the sample super-resolution image data and the high-definition image data.

The server may further input the sample super-resolution image data into the image quality enhancement network. The first sample enhanced image data is generated in the image quality enhancement network. The image quality loss function is generated according to the first sample enhanced image data and the high-definition image data.

The server may further input the first sample enhanced image data into the face enhancement network. In the face enhancement network, the sample enhanced face image obtained after performing enhancement processing on the face image in the first sample enhanced image data is generated. The face loss function is generated according to the sample enhanced face image and the high-definition face image in the high-definition image data. In the face enhancement network, the sample enhanced face image may be fused with the first sample enhanced image data, to obtain the second sample enhanced image data.

The server may further input the second sample enhanced image data into the sharpening network. The sharpening processing is performed on the second sample enhanced image data in the sharpening network, to obtain the sample sharpened image data. The sharpening loss function is generated according to the sample sharpened image data and the high-definition image data.

Step S106. Update a network parameter of the image processing network according to the super-resolution loss function, the image quality loss function, the face loss function, and the sharpening loss function, to obtain a trained image processing network.

In the present disclosure, the network parameter of the image processing network may include a network parameter of the super-resolution network, a network parameter of the image quality enhancement network, a network parameter of the face enhancement network, and a network parameter of the sharpening network. The server may update the network parameter of the image processing network according to the super-resolution loss function, the image quality loss function, the face loss function, and the sharpening loss function. There are two ways to update the network parameter of the image processing network according to the super-resolution loss function, the image quality loss function, the face loss function, and the sharpening loss function, which are specifically described below.

In the image processing network, the super-resolution network, the image quality enhancement network, the face enhancement network, and the sharpening network are arranged from front to back. The face enhancement network includes three networks that are used to process the face image, which are the face detection network, the face enhancement sub-network, and the face fusion network sequentially from front to back. The loss functions can be passed backward in the image processing network, so that the network parameters of the networks that have been passed to (such as the super-resolution network, the image quality enhancement network, the face enhancement network, and the sharpening network) are updated. Therefore, the first way to update the network parameters of the networks may include: adding a plurality of loss functions that are passed to a certain network, and directly updating the network parameter of the network according to the loss function obtained by summation. The second way to update the network parameter of the network may include: iteratively updating the network parameter of a certain network sequentially according to a plurality of loss functions that are passed to the network. The two ways of updating the network parameters of the networks achieve the same effect on updating the network parameters.

Specifically, the super-resolution loss function can only be passed backward to the super-resolution network. The image quality loss function can be passed backward to the image quality enhancement network and the super-resolution network. The face loss function can be passed backward to the face enhancement network, the image quality enhancement network, and the super-resolution network. Since the face enhancement network includes the face detection network, the face enhancement sub-network and the face fusion network from front to back, inside the face enhancement network, the loss function passed to the face detection network may be the face loss function, and the loss function passed to the face enhancement sub-network may be the color loss function, the texture loss function and the content loss function (namely the loss functions generated by the face enhancement sub-network itself) in the face loss function. The face loss function cannot be passed to the face fusion network. The sharpening loss function can be passed backward to the sharpening network, the face enhancement network, the image quality enhancement network, and the super-resolution network.

Therefore, the process in which the network parameter of each network is updated (namely, corrected) in the first way may be as follows: the super-resolution loss function, the image quality loss function, the face loss function and the sharpening loss function are added, and then the network parameter of the super-resolution network is updated according to the loss function obtained by summation, to obtain the trained super-resolution network; the image quality loss function, the face loss function and the sharpening loss function are added, and then the network parameter of the image quality enhancement network is updated according to the loss function obtained by summation, to obtain the trained image quality enhancement network; in the face enhancement network, the sharpening loss function and the face loss function are added, and then the network parameter of the face detection network is updated according to the loss function obtained by summation; the sharpening loss function, the color loss function, the texture loss function, and the content loss function are added, and then the network parameter of the face enhancement sub-network is updated according to the loss function obtained by summation; the network parameter of the face fusion network is updated according to the sharpening loss function, to obtain the trained face enhancement network; and the network parameter of the sharpening network is updated according to the sharpening loss function, to obtain the trained sharpening network.

The process in which the network parameter of each network is updated (namely, corrected) in the second way may be as follows: the network parameter of the super-resolution network is updated iteratively according to the super-resolution loss function, the image quality loss function, the face loss function, and the sharpening loss function in sequence. Through the iterative update, the trained super-resolution network is obtained. For example, first, the network parameter of the super-resolution network is updated according to the super-resolution loss function; next, the network parameter of the super-resolution network that has been updated according to the super-resolution loss function is updated according to the image quality loss function; then, the network parameter of the super-resolution network that has been updated according to the image quality loss function is updated according to the face loss function; and then, the network parameter of the super-resolution network that has been updated according to the face loss function is updated according to the sharpening loss function.

Similarly, the network parameter of the image quality enhancement network may be updated iteratively by the image quality loss function, the face loss function, and the sharpening loss function. The trained image quality enhancement network is obtained through the iterative update.

Similarly, the network parameter of the face detection network may be updated iteratively by the sharpening loss function and the face loss function in turn. The trained face detection network is obtained through iterative update. The network parameter of the face enhancement sub-network may be updated iteratively by the sharpening loss function, color loss function, texture loss function and content loss function in turn. The trained face enhancement sub-network is obtained through iterative update. The network parameter of the face fusion network is updated by the sharpening loss function, to obtain the trained face fusion network. The trained face enhancement network is obtained by the trained face detection network, the trained face enhancement sub-network and the trained face fusion network. The network parameter of the sharpening network is updated by the sharpening loss function, to obtain the trained sharpening network.

Therefore, the trained image processing network can be generated (namely, obtained) by the trained super-resolution network, the trained image quality enhancement network, the trained face enhancement network, and the trained sharpening network. The trained image processing network can be used for comprehensive optimization of video data or image data. The details may refer to the specific description in the embodiment corresponding to FIG. 7.

In the present disclosure, the networks (including the super-resolution network, the image quality enhancement network, the face enhancement network, and the sharpening network) are trained in an association manner, which, on the premise of ensuring the training effect of each network itself, realizes the effect of mutual promotion and mutual integration, thereby making the trained image processing network more accurate. Therefore, the trained image processing network can realize more accurate and better optimization of image data. That is, when training the image processing network, the present disclosure provides an end-to-end (from the super-resolution network to the sharpening network) multi-task (training one network may be one training task) joint training framework. The joint training framework is a cascading framework, in which the super-resolution network, the image quality enhancement network, the face enhancement network, and the sharpening network are linked in sequence. By using this cascading framework to train each network, better data collaborative training effect can be realized among these networks, and the training effects of the different tasks can be mutually promoted and integrated, which avoids conflict between the tasks, thereby achieving a good comprehensive effect. In addition, through a realistic training data generation schemes, including degradation kernel learning (such as the way of obtaining the sample image pair by the noise learning network), random data generation by the encoder-decoder module (such as the way of obtaining the sample image pair by performing encoding and decoding processing on sample video data at the target bit rate), simulation motion blur (such as the way of obtaining the sample image pair by performing average fusion processing on the target image frame and the adjacent image frames of the target image frame) and compression noise (such as the way of obtaining the sample image pair by performing distortion format conversion on the high-definition image data), the widely distributed training data is generated. Therefore, the image processing network trained using such training data is applied to a wide range of image optimization scenes and has stronger robustness.

According to the present disclosure, the sample image pair is obtained. The sample image pair includes low-definition image data and high-definition image data, and the low-definition image data has the same image content as the high-definition image data. The image processing network is called to adjust the resolution of the low-definition image data to the target resolution, so as to obtain the sample super-resolution image data, and the super-resolution loss function is generated according to the sample super-resolution image data and the high-definition image data. Next, the image processing network is called to perform image quality enhancement processing on the sample super-resolution image data, to obtain the first sample enhanced image data, and the image quality loss function is generated according to the first sample enhanced image data and the high-definition image data. Then, the image processing network is called to perform face enhancement processing on the face image in the first sample enhanced image data, to obtain the sample enhanced face image, the sample enhanced face image is fused with the first sample enhanced image data, to obtain the second sample enhanced image data, and the face loss function is generated according to the sample enhanced face image and the face image in the high-definition image data. After that, the image processing network is called to perform image sharpening processing on the second sample enhanced image data, to obtain the sample sharpened image data, and the sharpening loss function is generated according to the sample sharpened image data and the high-definition image data. Finally, the network parameter of the image processing network is updated according to the super-resolution loss function, the image quality loss function, the face loss function, and the sharpening loss function, to obtain the trained image processing network. Therefore, the method provided by the present disclosure can train the image processing network in a manner in which the multiple tasks (such as the super-resolution task, the image quality enhancement task, the face enhancement task, and the sharpening task) are associated and integrated with each other. As a result, when the trained image processing network performs multi-task image optimization simultaneously, there is no conflict between the different tasks, thereby improving the optimization effect.

Referring to FIG. 7, FIG. 7 is a schematic flowchart of an image processing method according to an embodiment of the present disclosure. This embodiment describes an application process of the trained image processing network. The content described in this embodiment may be combined with the content described in the embodiment corresponding to FIG. 3. The execution subject in this embodiment may be a server. As shown in FIG. 7, the method may include:

Step S201. Convert initial image data into super-resolution image data using a trained image processing network. A resolution of the super-resolution image data is greater than or equal to a target resolution.

In the present disclosure, the super-resolution network that needs to be called is the super-resolution network in the trained image processing network. That is, the called super-resolution network is the trained super-resolution network.

The server may obtain the initial image data. The initial image data may be any image that needs to be optimized. The optimization is performed on the high-resolution image data, thereby realizing better optimization effect. Therefore, the server may call the super-resolution network to detect the resolution of the initial image data. When the resolution of the initial image data is detected to be less than the target resolution, it indicates that the initial image data is image data with low resolution. In this case, the super-resolution network can be called to increase the resolution of the initial image data. For example, the super-resolution network is called to adjust the resolution of the initial image data to the target resolution (a high resolution which is set according to an actual application scenario). The initial image data whose resolution has been adjusted to the target resolution is used as the super-resolution image data.

When the resolution of the initial image data is detected to be greater than or equal to the target resolution, it indicates that the initial image data itself is image data with high resolution. In this case, there is no need to adjust the resolution of the initial image data, and the initial image data is directly used as the super-resolution image data.

Step S202. Perform image quality enhancement processing on the super-resolution image data by calling the trained image processing network, to obtain first enhanced image data.

In the present disclosure, the image quality enhancement network that needs to be called is the image quality enhancement network in the trained image processing network. That is, the called image quality enhancement network is the trained image quality enhancement network.

Since the image that has undergone the super-resolution processing may have a poor image quality, the server may further call the image quality enhancement network to perform overall optimization on the image quality of the super-resolution image data (namely image quality enhancement on the super-resolution image data). The image data after the image quality enhancement network optimizes the image quality of the image data may be used as the first enhanced image data.

Step S203. When there is a face image in the first enhanced image data, perform face enhancement on the face image in the first enhanced image data using the trained image processing network to obtain second enhanced image data.

In the present disclosure, the face enhancement network that needs to be called is the face enhancement network in the trained image processing network. That is, the called face enhancement network is the trained face enhancement network.

The called face enhancement network includes the face detection network, the face enhancement sub-network and the face fusion network. Since the face in the image data is generally an important element, the server may further perform face detection on the first enhanced image data by the face detection network, that is, whether there is a face image included in the first enhanced image data is detected.

When there is no face image detected in the first enhanced image data, the first enhanced image data may be directly used as the second enhanced image data.

When there is a face image detected in the first enhanced image data, the face enhancement sub-network is called to optimize the face image in the first enhanced image data. The first enhanced image data that has undergone the face image optimization is used as the second enhanced image data.

The process of calling the face enhancement sub-network to optimize the face image in the first enhanced image data may be as follows:

The server calls the face detection network to cut out the face image detected in the first enhanced image data, to obtain the face image in the first enhanced image data. The face image may be called the cut-out face image.

Then, the server calls the face enhancement sub-network to perform face enhancement processing on the cut-out face image, that is, perform face optimization on the cut-out face image. The cut-out face image that has undergone the face optimization may be called the enhanced face image.

Furthermore, the server calls the face fusion network to generate a face fusion mask (namely a fusion mask), which is used to perform weighted fusion on the enhanced face image and the first enhanced image data, to obtain the second enhanced image data. By the adaptive face fusion mask, seamless fusion can be realized between the enhanced face image and the first enhanced image data.

For example, the enhanced face image may be represented as a, the face fusion mask may be represented as b, and the first enhanced image data may be represented as c. Then, the second enhanced image data may be b*a+(1−b)*c.

The process of enhancing the face image in the first enhanced image data to obtain the second enhanced image data is the same as the process of enhancing the face image in the first sample enhanced image data to obtain the second sample enhanced image data.

Figure 8:
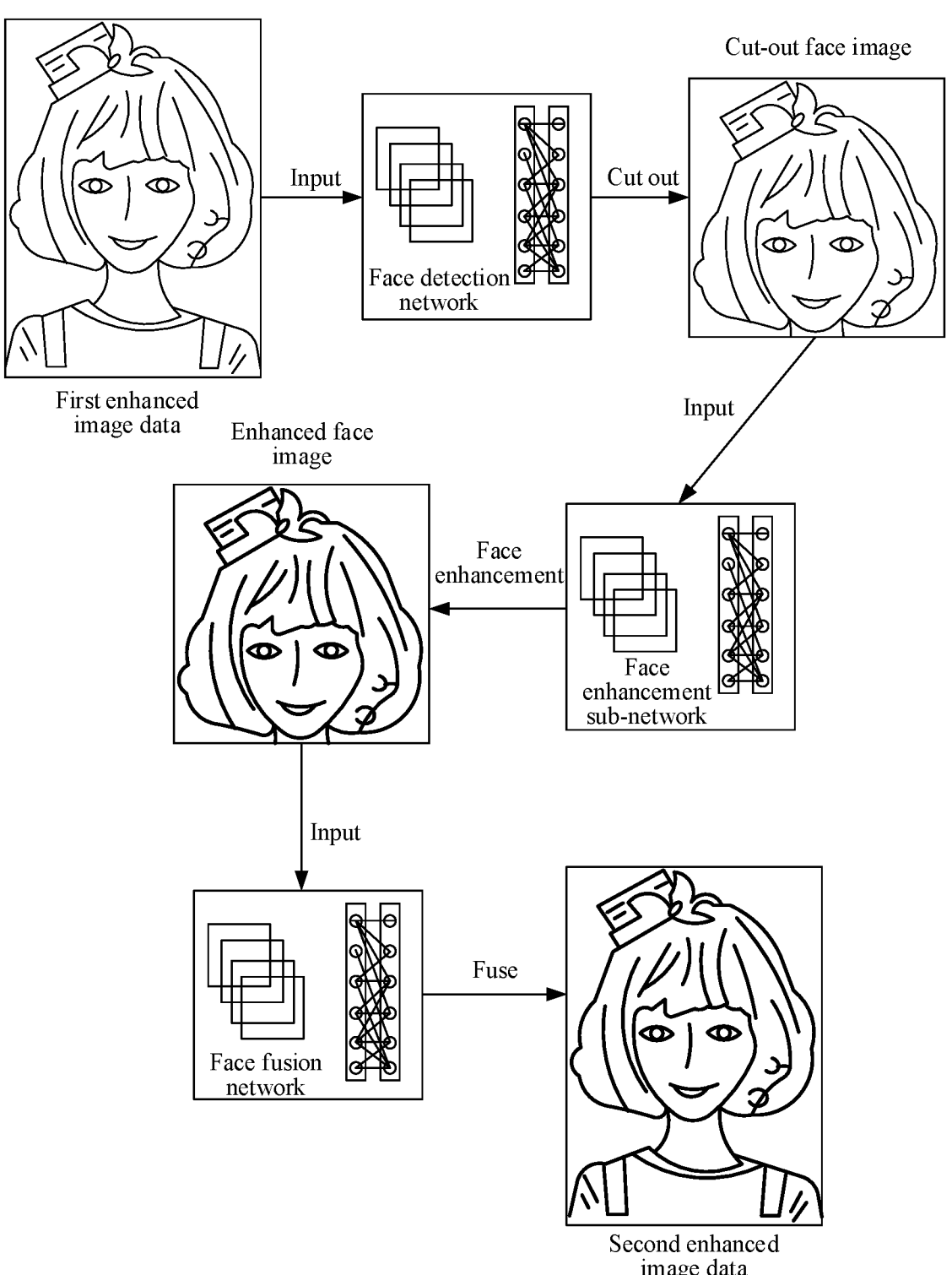
FIG. 8 is a schematic scenario diagram of face optimization according to an embodiment of the present disclosure.

Referring to FIG. 8, FIG. 8 is a schematic scenario diagram of face optimization according to the present disclosure. As shown in FIG. 8, the server may input the first enhanced image data obtained by the image quality enhancement network into the trained face detection network. The face image in the first enhanced image data may be cut out by the face detection network, to obtain the cut-out face image. The cut-out face image is inputted into the trained face enhancement sub-network. The face enhancement sub-network performs face enhancement on the cut-out face image, to obtain the enhanced face image. The enhanced face image and the first enhanced image data are inputted into the face fusion network, to realize the image fusion of the enhanced face image and the first enhanced image data. Finally, the second enhanced image data is obtained.

Step S204. Perform image sharpening processing on the second enhanced image data by calling the trained image processing network, to obtain sharpened image data, and output the sharpened image data.

In the present disclosure, the sharpening network that needs to be called is the sharpening network in the trained image processing network. That is, the called sharpening network is the trained sharpening network.

Finally, the details in the second enhanced image data may be enhanced by the sharpening network, so as to be clearer. The server calls the sharpening network to extract high-frequency components in the second enhanced image data. For example, the difference is calculated between the second enhanced image data that has undergone Gaussian blur processing and the original second enhanced image data, to obtain the high-frequency image information (namely the high-frequency components) in the second enhanced image data.

The server may further call the sharpening network to generate a sharpening mask of the second enhanced image data. The sharpening mask is used to indicate the detail components of the second enhanced image data that need to undergo sharpening enhancement. The server may calculate the dot product between the sharpening mask and the second enhanced image data, to obtain sharpened image information (namely the detail components) in the second enhanced image data. For example, the server may use the convolution layer (such as the 1*1 convolution layer) and the Prelu (the activation layer) included in the sharpening network, to generate the sharpening mask of the second enhanced image data.

In addition, the sharpening network may generate a weighted weight (called a first weighted weight) for the high-frequency image information, a weighted weight (called a second weighted weight) for the sharpened image information, and a weighted weight (called a third weighted weight) for the second enhanced image data. Then, weighted summation is performed on the high-frequency image information, the sharpened image information and the second enhanced image data with the first weighted weight, the second weighted weight and the third weighted weight, to obtain the sharpened image data.

For example, the product of the first weighted weight and the high-frequency image information is used as the first weight result, the product of the second weighted weight and the sharpened image information is used as the second weight result, and the product of the third weighted weight and the second enhanced image data is used as the third weight result. Then, the first weight result, the second weight result, and the third weight result are summed up, to obtain the sharpened image data.

The sharpened image data is the final image data obtained after optimizing the initial image data. The server may output the sharpened image data in the image processing network. The process of enhancing the second enhanced image data to obtain the sharpened image data is the same as the process of enhancing the second sample enhanced image data to obtain the sample sharpened image data.

Figure 9:
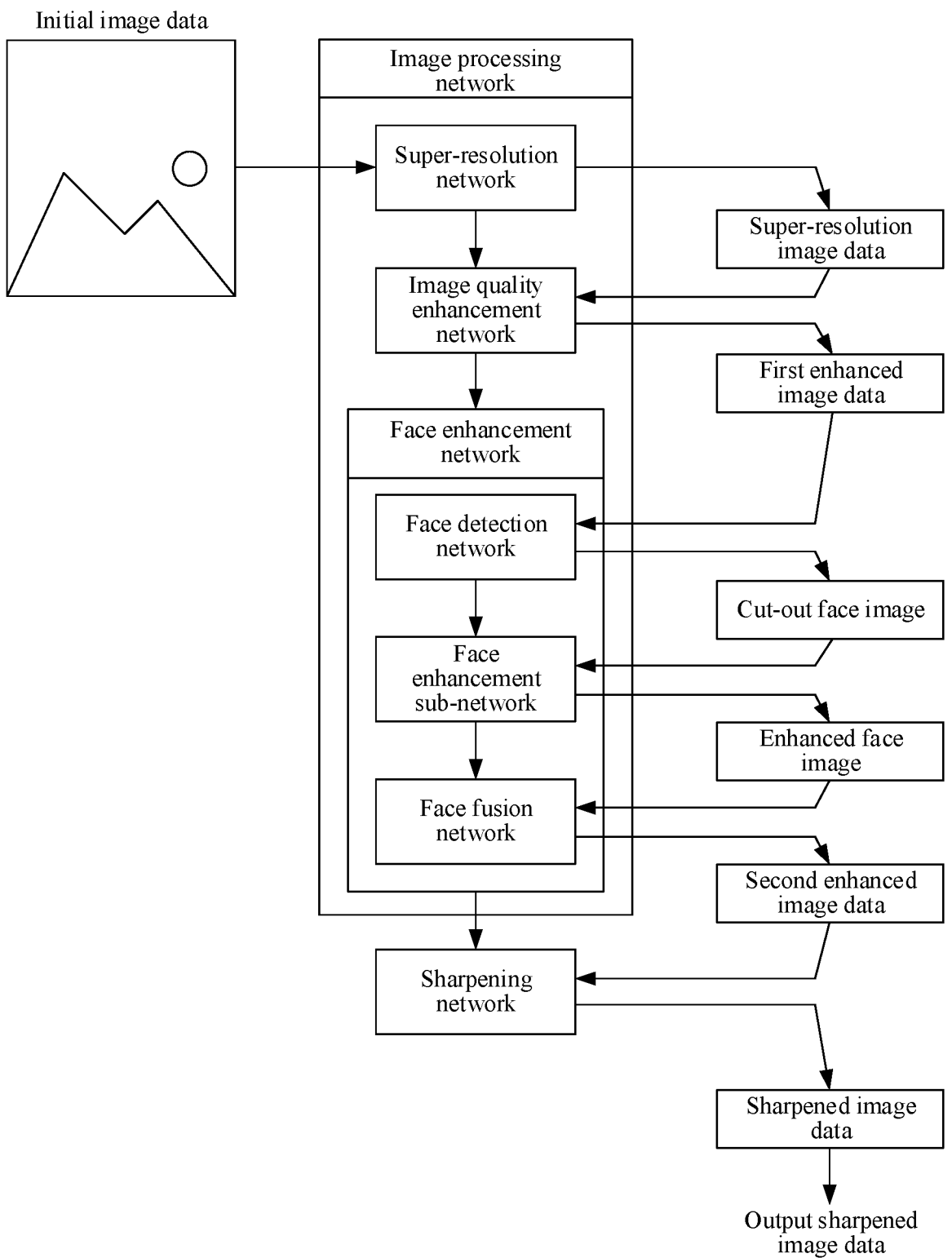
FIG. 9 is a schematic scenario diagram of image optimization according to an embodiment of the present disclosure.

Referring to FIG. 9, FIG. 9 is a schematic scenario diagram of image optimization according to an embodiment of the present disclosure. As shown in FIG. 9, the server may input the initial image data into the trained image processing network, and obtain the super-resolution image data corresponding to the initial image data by the super-resolution network in the image processing network. Next, the server performs image quality enhancement processing on the super-resolution image data by the image quality enhancement network, to obtain the first enhanced image data. Then, the server cuts out the face image (namely the cut-out face image) from the first enhanced image data by the face detection network in the face enhancement network; performs face enhancement on the cut-out face image by the face enhancement sub-network, to obtain the enhanced face image; and fuse the enhanced face image and the first enhanced image data by the face fusion network, to obtain the second enhanced image data. Finally, the server performs sharpening processing on the second enhanced image data by the sharpening network, to obtain the sharpened image data for output processing.

The initial image data may be any one of the plurality of image frames obtained by segmenting the video data. The server may be a back-end server of an application client, and the video data may be the data pushed to the application client. Therefore, the server may use each image frame included in the video data as the initial image data, and obtain the sharpened image data corresponding to each image frame included in the video data by using the foregoing process, and then generate the optimized video data of the video data with the sharpened image data corresponding to each image frame. The optimized video data is obtained by optimizing each image frame in the video data. The server may push the optimized video data to the application client, and the application client may output the optimized video data on the client interface for users to view.

Figure 10:
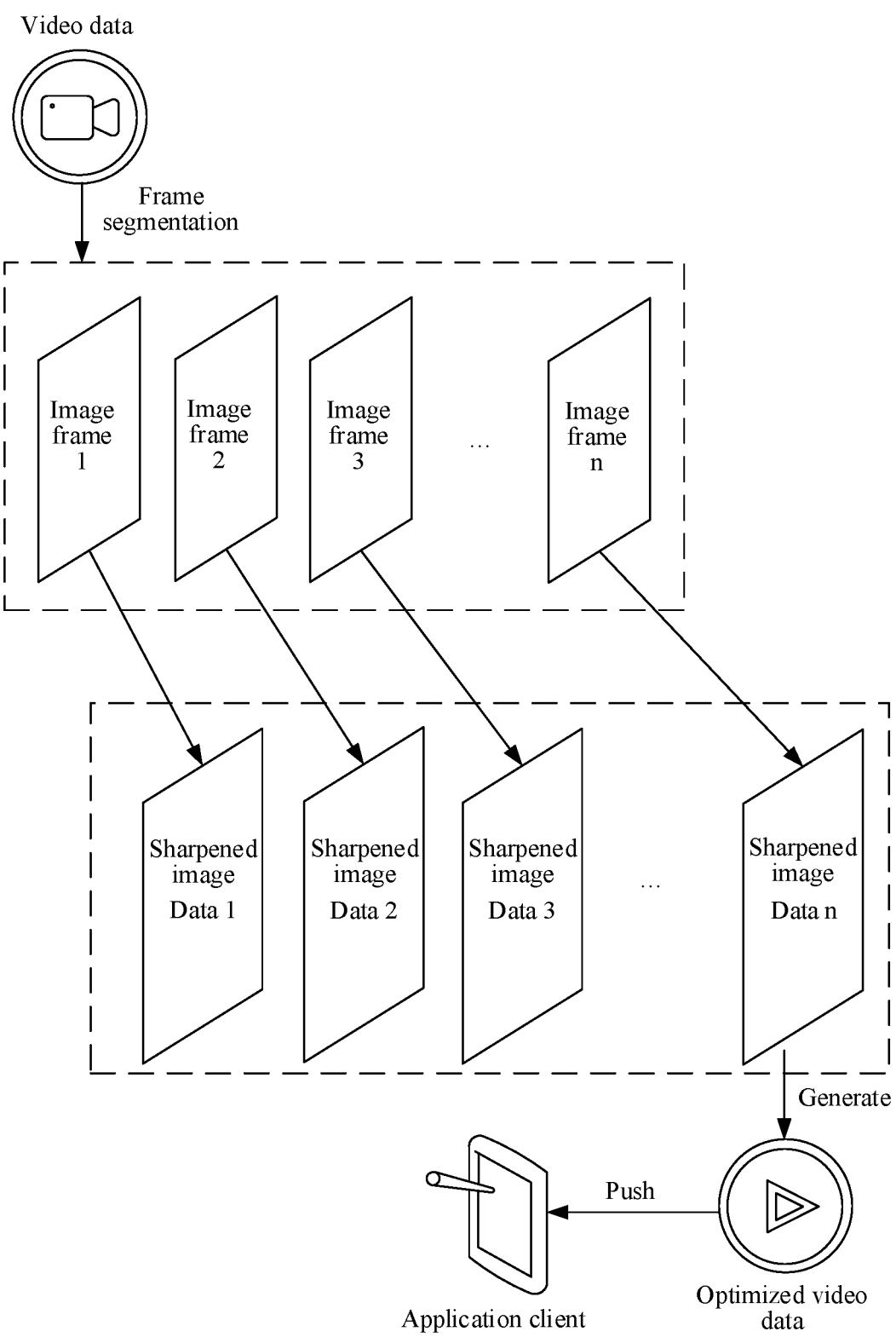
FIG. 10 is a schematic scenario diagram of data pushing according to an embodiment of the present disclosure.

Referring to FIG. 10, FIG. 10 is a schematic scenario diagram of data pushing according to an embodiment of the present disclosure. As shown in FIG. 10, the server may segment the video data, to obtain the plurality of image frames (such as the image frame 1 to the image frame n) included in the video data. The server may optimize each image frame obtained through segmentation by using the trained image processing network, to obtain the sharpened image data (such as the sharpened image data 1 to the sharpened image data n) corresponding to each image frame.

The optimized video data of the video data may be obtained according to the sharpened image data corresponding to each image frame. The server may push the optimized video data to the application client.

According to the method provided by the present disclosure, through the multi-task joint training framework including the super-resolution network, the image quality enhancement network, the face enhancement network and the sharpening network, the super-resolution network, the image quality enhancement network, the face enhancement network, and the sharpening network can be trained in a manner of mutual association, mutual integration, and mutual promotion. As a result, each of the super-resolution network, the image quality enhancement network, the face enhancement network, and the sharpening network is trained with good effect, and there is no conflict when these networks perform superimposed optimization on the image, thereby improving the overall optimization effect. The trained super-resolution network, the trained image quality enhancement network, and the trained sharpening network can realize comprehensive enhancement on the image data in properties of image quality, color, texture, and definition without conflict, thereby improving the image data in various aspects. Moreover, the trained face enhancement network has a special enhancement effect on the local face in the image data, thereby achieving global enhancement and local enhancement.

Figure 11:
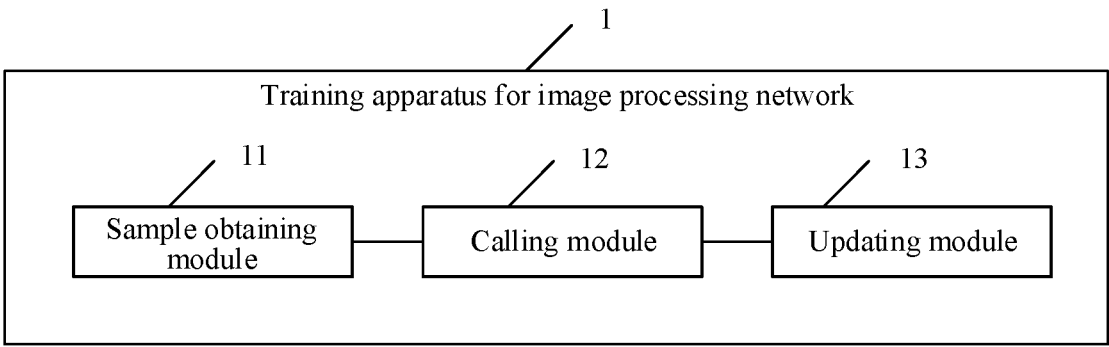
FIG. 11 is a schematic structural diagram of a training apparatus for an image processing network according to an embodiment of the present disclosure.

Referring to FIG. 11, FIG. 11 is a schematic structural diagram of a training apparatus for an image processing network according to an embodiment of the present disclosure. The training apparatus for the image processing network may be computer-readable instructions (including program code) running in a computer device. For example, the training apparatus for the image processing network is an application software, and the training apparatus for the image processing network is configured to perform corresponding steps in the method provided in the embodiments of the present disclosure. As shown in FIG. 11, the training apparatus 1 of the image processing network may include: a sample obtaining module 11, a calling module 12, and an updating module 13.

The sample obtaining module 11 is configured to obtain a sample image pair. The sample image pair includes low-definition image data and high-definition image data, and the low-definition image data has the same image content as the high-definition image data.

The calling module 12 is configured to call the image processing network to adjust a resolution of the low-definition image data to a target resolution, to obtain sample super-resolution image data, and generate a super-resolution loss function according to the sample super-resolution image data and high-definition image data.

The calling module 12 is further configured to call the image processing network to perform image quality enhancement processing on the sample super-resolution image data, to obtain first sample enhanced image data, and generate an image quality loss function according to the first sample enhanced image data and the high-definition image data.

The calling module 12 is further configured to call the image processing network to perform face enhancement processing on a face image in the first sample enhanced image data, to obtain a sample enhanced face image, fuse the sample enhanced face image with the first sample enhanced image data, to obtain second sample enhanced image data, and generate a face loss function according to the sample enhanced face image and a face image in the high-definition image data.

The calling module 12 is further configured to call the image processing network to perform image sharpening processing on the second sample enhanced image data, to obtain sample sharpened image data, and generate a sharpening loss function according to the sample sharpened image data and the high-definition image data.

The updating module 13 is configured to call the image processing network to update a network parameter of the image processing network according to the super-resolution loss function, the image quality loss function, the face loss function, and the sharpening loss function, to obtain a trained image processing network.

In some embodiments, the image processing network includes a super-resolution network, an image quality enhancement network, a face enhancement network, and a sharpening network. The sample super-resolution image data is obtained by the super-resolution network, the first sample enhanced image data is obtained by the image quality enhancement network, the second sample enhanced image data is obtained by the face enhancement network, and the sample sharpened image data is obtained by the sharpening network.

The way in which the updating module 13 updates the network parameter of the image processing network according to the super-resolution loss function, the image quality loss function, the face loss function, and the sharpening loss function, to obtain the trained image processing network includes:

updating a network parameter of the super-resolution network according to the super-resolution loss function, the image quality loss function, the face loss function, and the sharpening loss function, to obtain a trained super-resolution network;

updating a network parameter of the image quality enhancement network according to the image quality loss function, the face loss function, and the sharpening loss function, to obtain a trained image quality enhancement network;

updating a network parameter of the face enhancement network according to the face loss function and the sharpening loss function, to obtain a trained face enhancement network;

updating a network parameter of the sharpening network according to the sharpening loss function, and obtaining a trained sharpening network; and generating the trained image processing network according to the trained super-resolution network, the trained image quality enhancement network, the trained face enhancement network, and the trained sharpening network.

In some embodiments, the way in which the calling module 12 generates the super-resolution loss function according to the sample super-resolution image data and the high-definition image data includes:

generating a first super-resolution loss function according to pixel value elements included in the sample super-resolution image data and pixel value elements included in the high-definition image data;

generating a second super-resolution loss function according to feature value elements included in feature maps of the sample super-resolution image data and feature value elements included in feature maps of the high-definition image data; and generating the super-resolution loss function according to the first super-resolution loss function and the second super-resolution loss function.

In some embodiments, the image processing network includes the face enhancement network. The second sample enhanced image data is obtained by the face enhancement network. The face enhancement network includes a face detection network, a color discrimination network, and a texture discrimination network. A face image in the first sample enhanced image data is provided with a face detection box generated by the face detection network and a face label box used for indicating an actual face position.

The way in which the calling module 12 generates the face loss function according to the sample enhanced face image and the face image in the high-definition image data includes:

generating a detection loss function according to the face detection box and the face label box;

cutting out the face image from the high-definition image data, to obtain a high-definition face image;

generating, by the color discrimination network, a color loss function according to the high-definition face image and the sample enhanced face image;

generating, by the texture discrimination network, a texture loss function according to the high-definition face image and the sample enhanced face image;

generating a content loss function according to feature value elements included in feature maps of the sample enhanced face image and feature value elements included in feature maps of the high-definition face image; and generating the face loss function according to the detection loss function, the color loss function, the texture loss function, and the content loss function.

In some embodiments, the way in which the calling module 12 generates the sharpening loss function according to the sample sharpened image data and the high-definition image data includes:

generating a mass loss function according to a PSNR between the sample sharpened image data and the high-definition image data;

generating a perceptual loss function according to a perceptual similarity between the sample sharpened image data and the high-definition image data; and generating the sharpening loss function according to the mass loss function and the perceptual loss function.

In some embodiments, the way in which the sample obtaining module 11 obtains the sample image pair includes:

obtaining sample video data;

segmenting the sample video data, to obtain a plurality of sample image frames included in the sample video data;

performing encoding and decoding processing on the sample video data at a target bit rate, to obtain low-quality video data corresponding to the sample video data, an image frame quality of the low-quality video data being lower than an image frame quality of the sample video data, the low-quality video data including low-quality image frames each corresponding to each sample image frame, and the target bit rate being lower than a bit rate threshold; and constructing the sample image pair according to each sample image frame and the corresponding low-quality image frame.

In some embodiments, the way in which the sample obtaining module 11 obtains the sample image pair includes:

obtaining sample video data;

segmenting the sample video data, to obtain a plurality of sample image frames included in the sample video data;

selecting a target image frame from the plurality of sample image frames as the high-definition image data; and performing average fusion processing on the target image frame and adjacent image frames of the target image frame in the plurality of sample image frames, to obtain the low-definition image data.

In some embodiments, the way in which the sample obtaining module 11 obtains the sample image pair includes:

obtaining the high-definition image data; and performing Gaussian blur processing on the high-definition image data, to obtain the low-definition image data.

In some embodiments, the way in which the sample obtaining module obtains the sample image pair includes:

obtaining the high-definition image data; and performing distortion format conversion on the high-definition image data, to obtain the low-definition image data.

In some embodiments, the way in which the sample obtaining module 11 obtains the sample image pair includes:

obtaining the high-definition image data; and obtaining sample low-definition video data, and inputting the sample low-definition video data into a noise learning network; a definition of the sample low-definition video data being lower than a definition threshold;

learning noise data of the sample low-definition video data based on the noise learning network; and fusing the noise data in the high-definition image data, to obtain the low-definition image data.

According to an embodiment of the present invention, the steps involved in the training method for the image processing network shown in FIG. 3 may be performed by the modules of the training apparatus 1 of the image processing network shown in FIG. 11. For example, step S101 shown in FIG. 3 is executed by the sample obtaining module 11 in FIG. 11, step S102 to step S105 shown in FIG. 3 are executed by the calling module 12 in FIG. 11, and step S106 shown in FIG. 3 is executed by the updating module 13 shown in FIG. 11.

According to the present disclosure, the sample image pair is obtained. The sample image pair includes low-definition image data and high-definition image data, and the low-definition image data has the same image content as the high-definition image data. The image processing network is called to adjust the resolution of the low-definition image data to the target resolution, so as to obtain the sample super-resolution image data, and the super-resolution loss function is generated according to the sample super-resolution image data and the high-definition image data. Next, the image processing network is called to perform image quality enhancement processing on the sample super-resolution image data, to obtain the first sample enhanced image data, and the image quality loss function is generated according to the first sample enhanced image data and the high-definition image data. Then, the image processing network is called to perform face enhancement processing on the face image in the first sample enhanced image data, to obtain the sample enhanced face image, the sample enhanced face image is fused with the first sample enhanced image data, to obtain the second sample enhanced image data, and the face loss function is generated according to the sample enhanced face image and the face image in the high-definition image data. After that, the image processing network is called to perform image sharpening processing on the second sample enhanced image data, to obtain the sample sharpened image data, and the sharpening loss function is generated according to the sample sharpened image data and the high-definition image data. Finally, the network parameter of the image processing network is updated according to the super-resolution loss function, the image quality loss function, the face loss function, and the sharpening loss function, to obtain the trained image processing network. Therefore, the apparatus provided by the present disclosure can train the image processing network in a manner in which the multiple tasks (such as the super-resolution task, the image quality enhancement task, the face enhancement task, and the sharpening task) are associated and integrated with each other. As a result, when the trained image processing network performs multi-task image optimization simultaneously, there is no conflict between the different tasks, thereby improving the optimization effect.

According to an embodiment of the present disclosure, each module in the training apparatus 1 for the image processing network shown in FIG. 11 may be separately or all combined into one or more several units. Alternatively, a(some) unit(s) in the training apparatus may be further disassembled into a plurality of units having smaller functions. In this way, same operations may be implemented without affecting achieving the technical effects of the embodiments of the present disclosure. The foregoing modules are divided based on logical functions. In an actual application, a function of one module may be implemented by a plurality of units, or functions of a plurality of units are implemented by one module. In other embodiments of the present disclosure, the training apparatus 1 for the image processing network may include another unit. In an actual application, these functions may be cooperatively implemented by another unit and may be cooperatively implemented by a plurality of units.

According to an embodiment of the present disclosure, the image processing apparatus 1 shown in FIG. 11 may be constructed and the training method for the image processing network according to the embodiments of the present disclosure may be implemented, by running a computer-readable instruction (including program code) capable of performing the steps involved in the corresponding method shown in FIG. 3 on a generic computer device, such as a computer, including processing units and storage units, such as a central processing unit (CPU), a random access memory (RAM), a read-only memory (ROM), and the like. The computer-readable instructions may be stored on, for example, a computer-readable recording medium, and may be loaded into the foregoing computing device by the computer-readable recording medium, and run in the computing device.

Figure 12:
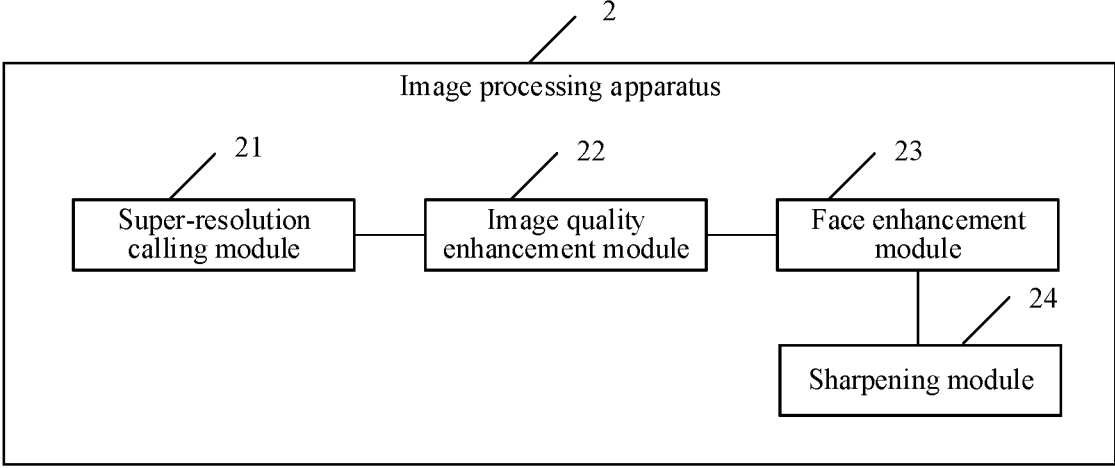
FIG. 12 is a schematic structural diagram of an image processing apparatus according to an embodiment of the present disclosure.

Referring to FIG. 12, FIG. 12 is a schematic structural diagram of an image processing apparatus according to an embodiment of the present disclosure. The image processing apparatus may be computer-readable instructions (including program code) running in a computer device. For example, the image processing apparatus is an application software, and is configured to perform the corresponding steps in the method provided in the embodiments of the present disclosure. As shown in FIG. 12, the image processing apparatus 2 may include: a super-resolution calling module 21, an image quality enhancement module 22, a face enhancement module 23, and a sharpening module 24.

The super-resolution calling module 21 is configured to obtain super-resolution image data corresponding to initial image data by calling a trained image processing network. A resolution of the super-resolution image data is greater than or equal to a target resolution.

The image quality enhancement module 22 is configured to perform image quality enhancement processing on the super-resolution image data by calling the trained image processing network, to obtain first enhanced image data.

The face enhancement module 23 is configured to obtain second enhanced image data corresponding to the first enhanced image data by calling the trained image processing network. When there is a face image in the first enhanced image data, the second enhanced image data is image data obtained after performing face enhancement on the face image in the first enhanced image data.

The sharpening module 24 is configured to perform image sharpening processing on the second enhanced image data by calling the trained image processing network, to obtain sharpened image data, and output the sharpened image data.

In some embodiments, the trained image processing network includes a super-resolution network. The way in which the super-resolution calling module 21 obtains the image data corresponding to the initial image data by calling the trained image processing network includes:

obtaining the initial image data;

detecting a resolution of the initial image data by calling the super-resolution network;

when the resolution of the initial image data is greater than or equal to the target resolution, determining the initial image data as the super-resolution image data; and when the resolution of the initial image data is less than the target resolution, adjusting the resolution of the initial image data to the target resolution by calling the super-resolution network, to obtain the super-resolution image data.

In some embodiments, the trained image processing network includes a face enhancement network. The way in which the face enhancement module 23 obtains the second enhanced image data corresponding to the first enhanced image data by calling the trained image processing network includes:

performing face detection on the first enhanced image data by calling the face enhancement network;

when there is no face image in the first enhanced image data, determining the first enhanced image data as the second enhanced image data; and when there is a face image in the first enhanced image data, performing face enhancement processing on the face image in the first enhanced image data by calling the face enhancement network, to obtain the second enhanced image data.

In some embodiments, the face enhancement network includes a face detection network, a face enhancement sub-network, and a face fusion network.

The way in which the face enhancement module 23 performs face enhancement processing on the face image in the first enhanced image data by calling the face enhancement network, to obtain the second enhanced image data includes:

cutting out the face image from the first enhanced image data by calling the face detection network, to obtain a cut-out face image;

performing face enhancement processing on the cut-out face image by calling the face enhancement sub-network, to obtain an enhanced face image;

generating a face fusion mask by calling the face fusion network; and performing image fusion processing on the first enhanced image data and the enhanced face image according to the face fusion mask, to obtain the second enhanced image data.

In some embodiments, the trained image processing network includes a sharpening network. The way in which the sharpening module 24 performs image sharpening processing on the second enhanced image data by calling the trained image processing network, to obtain the sharpened image data includes:

extracting high-frequency image information in the second enhanced image data by calling the sharpening network;

generating a sharpening mask for the second enhanced image data by the sharpening network, and extracting sharpened image information in the second enhanced image data according to the sharpening mask;

predicting a first weighted weight for the high-frequency image information, a second weighted weight for the sharpened image information, and a third weighted weight for the second enhanced image data by the sharpening network; and performing a weighted sum of the high-frequency image information, the sharpened image information, and the second enhanced image data according to the first weighted weight, the second weighted weight, and the third weighted weight, to obtain the sharpened image data.

In some embodiments, the initial image data is any one of a plurality of image frames obtained by segmenting the video data. The apparatus 2 is further configured to:

generate optimized video data of the video data according to the sharpened image data corresponding to each image frame in the plurality of image frames; and push the optimized video data to an application client, to allow the application client to output the optimized video data.

According to an embodiment of the present disclosure, the steps of the image processing method shown in FIG. 7 may be executed by the modules of the image processing apparatus 2 shown in FIG. 12. For example, step S201 shown in FIG. 7 may be executed by the super-resolution calling module 21 shown in FIG. 12; step S202 shown in FIG. 7 may be executed by the image quality enhancement module 22 shown in FIG. 12; step S203 shown in FIG. 7 may be executed by the face enhancement module 23 shown in FIG. 12; and step S204 shown in FIG. 7 may be executed by the sharpening module 24 shown in FIG. 12.

According to the present disclosure, the sample image pair is obtained. The sample image pair includes low-definition image data and high-definition image data, and the low-definition image data has the same image content as the high-definition image data. The image processing network is called to adjust the resolution of the low-definition image data to the target resolution, so as to obtain the sample super-resolution image data, and the super-resolution loss function is generated according to the sample super-resolution image data and the high-definition image data. The image processing network is called to perform image quality enhancement processing on the sample super-resolution image data, to obtain the first sample enhanced image data, and the image quality loss function is generated according to the first sample enhanced image data and the high-definition image data. The image processing network is called to perform face enhancement processing on the face image in the first sample enhanced image data, to obtain the sample enhanced face image, the sample enhanced face image is fused with the first sample enhanced image data, to obtain the second sample enhanced image data, and the face loss function is generated according to the sample enhanced face image and the face image in the high-definition image data. The image processing network is called to perform image sharpening processing on the second sample enhanced image data, to obtain the sample sharpened image data, and the sharpening loss function is generated according to the sample sharpened image data and the high-definition image data. The network parameter of the image processing network is updated according to the super-resolution loss function, the image quality loss function, the face loss function, and the sharpening loss function, to obtain the trained image processing network. Therefore, the apparatus provided by the present disclosure can train the image processing network in a manner in which the multiple tasks (such as the super-resolution task, the image quality enhancement task, the face enhancement task, and the sharpening task) are associated and integrated with each other. As a result, when the trained image processing network performs multi-task image optimization simultaneously, there is no conflict between the different tasks, thereby improving the optimization effect.

According to an embodiment of the present disclosure, each module in the image processing apparatus 2 shown in FIG. 12 may be separately or all combined into one or more several units. Alternatively, a(some) unit(s) in the training apparatus may be further disassembled into a plurality of units having smaller functions. In this way, same operations may be implemented without affecting achieving the technical effects of the embodiments of the present disclosure. The foregoing modules are divided based on logical functions. In an actual application, a function of one module may be implemented by a plurality of units, or functions of a plurality of units are implemented by one module. In other embodiments of the present disclosure, the image processing apparatus 2 may include another unit. In an actual application, these functions may be cooperatively implemented by another unit and may be cooperatively implemented by a plurality of units.

According to an embodiment of the present disclosure, the image processing apparatus 2 shown in FIG. 12 may be constructed and the training method for the image processing network according to the embodiments of the present disclosure may be implemented, by running computer-readable instructions (including program code) capable of performing the steps involved in the corresponding method shown in FIG. 7 on a generic computer device, such as a computer, including processing units and storage units, such as a CPU, a RAM, a ROM, and the like. The computer-readable instructions may be stored on, for example, a computer-readable recording medium, and may be loaded into the foregoing computing device by the computer-readable recording medium, and run in the computing device.

Figure 13:
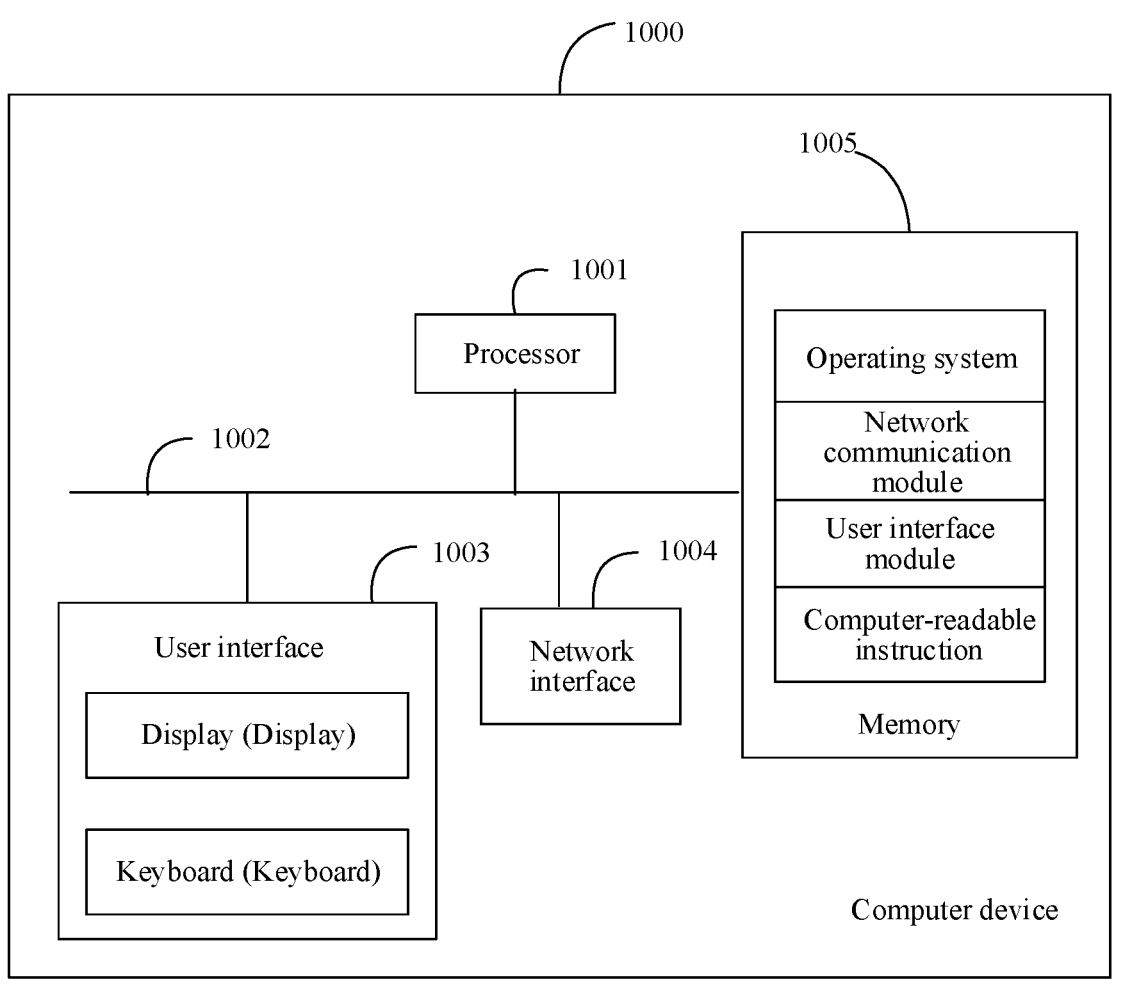
FIG. 13 is a schematic structural diagram of a computer device according to an embodiment of the present disclosure.

Referring to FIG. 13, FIG. 13 is a schematic structural diagram of a computer device according to an embodiment of the present disclosure. As shown in FIG. 13, the computer device 1000 may include: a processor 1001, a network interface 1004, and a memory 1005. In addition, the computer device 1000 may further include: a user interface 1003, and at least one communication bus 1002. The communications bus 1002 is used to implement connection and communication between these components. The user interface 1003 may include a display and a keyboard. In some embodiments, the user interface 1003 may further include a standard wired interface and wireless interface. The network interface 1004 may optionally include a standard wired interface and wireless interface (for example, a Wi-Fi interface). The memory 1005 may be a high-speed RAM memory, or may be a non-volatile memory, for example, at least one magnetic disk memory. In some embodiments, the memory 1005 may be at least one storage apparatus that is located far away from the foregoing processor 1001. As shown in FIG. 13, the memory 1005, as a computer storage medium, may include an operating system, a network communications module, a user interface, and computer-readable instructions. The computer-readable instructions, when being executed, implement at least one of the training method for the image processing network and the image processing method.

In the computer device 1000 shown in FIG. 13, the network interface 1004 is able to provide a network communication function. The user interface 1003 is mainly used to provide a user with an input interface. The processor 1001 is used to call the computer-readable instructions stored in the memory 1005, so as to implement the training method for the image processing network according to the present disclosure.

The processor 1001 is further configured to call the computer-readable instructions stored in the memory 1005, so as to implement the image processing method according to the present disclosure.

The computer device 1000 described in the embodiments of the present disclosure may perform the foregoing training method for the image processing network in the embodiments corresponding to FIG. 3, and perform the foregoing image processing method in the embodiments corresponding to FIG. 7, which is not detailed herein. In addition, the description of beneficial effects of the same method are not described herein again.

In addition, the present disclosure further provides a computer-readable storage medium, storing computer-readable instructions executed by the training apparatus 1 for the image processing network and the image processing apparatus 2. The program instructions, when being executed by a processor, implement the training method for the image processing network in the corresponding embodiment shown in FIG. 3 and the image processing method in the corresponding embodiment shown in FIG. 7, which is not detailed herein. The description of beneficial effects of the same method are not described herein again. The technical details that are not disclosed in the computer storage medium embodiments of the present disclosure may refer to the descriptions of the method embodiments of the present disclosure.

As an example, the foregoing program instructions may be deployed and executed on one computer device, or deployed and executed on multiple computer devices located at one location, or executed on a plurality of computer devices distributed at a plurality of locations and interconnected through a communication network. The plurality of computer devices distributed at the plurality of locations and interconnected through the communication network may form a blockchain network.

The computer-readable storage medium may be the training apparatus for the image processing network provided by any one of the foregoing embodiments or an internal storage unit of the computer device, such as, a hard disk or an internal memory of the computer device. The computer-readable storage medium may be an external storage device, such as, a plug-in hard disk, a smart memory card (SMC), a secure digital (SD) card, a flash card, and the like, of the computer device that are equipped on the computer device. Further, the computer-readable storage medium may include both the internal storage unit of the computer device and the external storage device. The computer-readable storage medium is used to store the computer-readable instructions, and other programs and data required by the computer device. The computer-readable storage medium may be further used to temporarily store data that has been output or will be output.

The present disclosure further provides a computer program product or a computer program, the computer program product or the computer program including computer-readable instructions stored in a computer-readable storage medium. The processor of the computer device reads the computer-readable instructions from the computer-readable storage medium, and the processor executes the computer-readable instructions, so that the computer device executes the foregoing training method for the image processing network in the embodiment corresponding to FIG. 3 and the image processing method in the embodiment corresponding to FIG. 7. In addition, the description of beneficial effects of the same method are not described herein again. The technical details that are not disclosed in the computer-readable storage medium embodiments of the present disclosure may refer to the descriptions of the method embodiments of the present disclosure.

Terminologies such as "first", "second", "third", and "fourth" in this specification, claims, and the accompanying drawings of the present disclosure are used to distinguish different objects and are not used to describe a specific sequence. In addition, the terms "include", "have", and any variant thereof are intended to cover a non-exclusive inclusion. For example, a process, method, system, product, or device that includes a series of steps or units is not limited to the listed steps or units; and instead, further optionally includes a step or unit that is not listed, or further optionally includes another step or unit that is intrinsic to the process, method, product, or device.

A person of ordinary skill in the art may understand that, units and algorithm steps of the examples described in the foregoing disclosed embodiments may be implemented by electronic hardware, computer software, or a combination thereof. To clearly describe the interchangeability between the hardware and the software, the foregoing has generally described compositions and steps of each example based on functions. Whether the functions are executed in a mode of hardware or software depends on particular applications and design constraint conditions of the technical solutions. A person skilled in the art may use different methods to implement the described functions for each particular application, but it should not be considered that the implementation goes beyond the scope of the present disclosure.

The methods and the related apparatus provided by the embodiments of the present disclosure are described with reference to the method flowcharts and/or the schematic structural diagrams provided by the embodiments of the present disclosure. Specifically, each process and/or block of the method flowcharts and/or the schematic structural diagrams and a combination of processes and/or blocks in the flowcharts and/or the block diagrams may be implemented by the computer-readable instructions. These computer program instructions may be provided to a general-purpose computer, a dedicated computer, an embedded processor, or a processor of another programmable data processing apparatus to generate a machine, so that the instructions executed by the computer or the processor of another programmable data processing apparatus generate an apparatus for implementing a specific function in one or more processes in the flowcharts and/or in one or more blocks in the block diagrams. These computer program instructions may also be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams. These computer program instructions may also be loaded onto a computer or another programmable data processing device, so that a series of operations and steps are performed on the computer or another programmable device, thereby generating computer-implemented processing. Therefore, the instructions executed on the computer or another programmable device provide steps for implementing a specific function in one or more processes in the flowcharts and/or in one or more blocks in the block diagrams.

In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. What is disclosed above is merely exemplary embodiments of the present disclosure, and certainly is not intended to limit the scope of the claims of the present disclosure. Therefore, equivalent variations made in accordance with the claims of the present disclosure shall fall within the scope of the present disclosure.

What is claimed is:

1. An image processing method performed by a computer device, and the method comprising:

converting initial image data into super-resolution image data using a trained image processing network, a resolution of the super-resolution image data being greater than or equal to a target resolution;

performing image quality enhancement processing on the super-resolution image data using the trained image processing network, to obtain first enhanced image data;

when there is a face image in the first enhanced image data, performing face enhancement on the face image in the first enhanced image data using the trained image processing network to obtain second enhanced image data;

extracting high-frequency image information in the second enhanced image data using a sharpening network;

generating a sharpening mask for the second enhanced image data by the sharpening network;

extracting sharpened image information in the second enhanced image data according to the sharpening mask;

predicting a first weighted weight for the high-frequency image information, a second weighted weight for the sharpened image information, and a third weighted weight for the second enhanced image data by the sharpening network; and performing a weighted sum of the high-frequency image information, the sharpened image information, and the second enhanced image data according to the first weighted weight, the second weighted weight, and the third weighted weight, to obtain the sharpened image data.

2. The method according to claim 1, wherein the trained image processing network comprises a super-resolution network, and the converting initial image data into super-resolution image data using a trained image processing network comprises:

detecting a resolution of the initial image data; and when the resolution of the initial image data is less than the target resolution, adjusting the resolution of the initial image data to the target resolution using the super-resolution network, to obtain the super-resolution image data.

3. The method according to claim 1, wherein the trained image processing network comprises a face enhancement network; and the performing face enhancement on the face image in the first enhanced image data using the trained image processing network to obtain second enhanced image data comprises:

performing face detection on the first enhanced image data using the face enhancement network; and when there is a face image in the first enhanced image data, performing face enhancement processing on the face image in the first enhanced image data using the face enhancement network, to obtain the second enhanced image data.

4. The method according to claim 3, wherein the face enhancement network comprises a face detection network, a face enhancement sub-network, and a face fusion network;

the performing face enhancement on the face image in the first enhanced image data using the trained image processing network to obtain second enhanced image data comprises:

cutting out the face image from the first enhanced image data using the face detection network, to obtain a cut-out face image;

performing the face enhancement processing on the cut-out face image using the face enhancement sub-network, to obtain an enhanced face image;

generating a face fusion mask using the face fusion network; and performing image fusion processing on the first enhanced image data and the enhanced face image according to the face fusion mask, to obtain the second enhanced image data.

5. The method according to claim 1, wherein the initial image data is any one of a plurality of image frames obtained by segmenting video data; and the method further comprises:

generating optimized video data of the video data according to the sharpened image data corresponding to each image frame in the plurality of image frames; and pushing the optimized video data to an application client, to allow the application client to output the optimized video data.

6. The method according to claim 1, wherein the trained image processing network is trained by:

obtaining a sample image pair, the sample image pair comprising low-definition image data and high-definition image data, and the low-definition image data having the same content as the high-definition image data;

calling the image processing network to adjust a resolution of the low-definition image data to a target resolution, to obtain sample super-resolution image data, and generating a super-resolution loss function according to the sample super-resolution image data and the high-definition image data;

calling the image processing network to perform image quality enhancement processing on the sample super-resolution image data, to obtain first sample enhanced image data, and generating an image quality loss function according to the first sample enhanced image data and the high-definition image data;

calling the image processing network to perform face enhancement processing on a face image in the first sample enhanced image data, to obtain a sample enhanced face image, fusing the sample enhanced face image with the first sample enhanced image data, to obtain second sample enhanced image data, and generating a face loss function according to the sample enhanced face image and a face image in the high-definition image data;

calling the image processing network to perform image sharpening processing on the second sample enhanced image data, to obtain sample sharpened image data, and generating a sharpening loss function according to the sample sharpened image data and the high-definition image data; and updating a network parameter of the image processing network according to the super-resolution loss function, the image quality loss function, the face loss function, and the sharpening loss function, to obtain the trained image processing network.

7. A computer device, comprising a memory and a processor, the memory storing computer-readable instructions, and the computer-readable instructions, when being executed by the processor, causing the computer device to perform an image processing method including:

converting initial image data into super-resolution image data using a trained image processing network, a resolution of the super-resolution image data being greater than or equal to a target resolution;

performing image quality enhancement processing on the super-resolution image data using the trained image processing network, to obtain first enhanced image data;

when there is a face image in the first enhanced image data, performing face enhancement on the face image in the first enhanced image data using the trained image processing network to obtain second enhanced image data;

extracting high-frequency image information in the second enhanced image data using a sharpening network;

generating a sharpening mask for the second enhanced image data by the sharpening network;

extracting sharpened image information in the second enhanced image data according to the sharpening mask;

predicting a first weighted weight for the high-frequency image information, a second weighted weight for the sharpened image information, and a third weighted weight for the second enhanced image data by the sharpening network; and performing a weighted sum of the high-frequency image information, the sharpened image information, and the second enhanced image data according to the first weighted weight, the second weighted weight, and the third weighted weight, to obtain the sharpened image data.

8. The computer device according to claim 7, wherein the trained image processing network comprises a super-resolution network, and the converting initial image data into super-resolution image data using a trained image processing network comprises:

detecting a resolution of the initial image data; and when the resolution of the initial image data is less than the target resolution, adjusting the resolution of the initial image data to the target resolution using the super-resolution network, to obtain the super-resolution image data.

9. The computer device according to claim 7, wherein the trained image processing network comprises a face enhancement network; and the performing face enhancement on the face image in the first enhanced image data using the trained image processing network to obtain second enhanced image data comprises:

performing face detection on the first enhanced image data using the face enhancement network; and when there is a face image in the first enhanced image data, performing face enhancement processing on the face image in the first enhanced image data using the face enhancement network, to obtain the second enhanced image data.

10. The computer device according to claim 9, wherein the face enhancement network comprises a face detection network, a face enhancement sub-network, and a face fusion network;

the performing face enhancement on the face image in the first enhanced image data using the trained image processing network to obtain second enhanced image data comprises:

cutting out the face image from the first enhanced image data using the face detection network, to obtain a cut-out face image;

performing the face enhancement processing on the cut-out face image using the face enhancement sub-network, to obtain an enhanced face image;

generating a face fusion mask using the face fusion network; and performing image fusion processing on the first enhanced image data and the enhanced face image according to the face fusion mask, to obtain the second enhanced image data.

11. The computer device according to claim 7, wherein the initial image data is any one of a plurality of image frames obtained by segmenting video data; and the method further comprises:

generating optimized video data of the video data according to the sharpened image data corresponding to each image frame in the plurality of image frames; and pushing the optimized video data to an application client, to allow the application client to output the optimized video data.

12. The computer device according to claim 7, wherein the trained image processing network is trained by:

obtaining a sample image pair, the sample image pair comprising low-definition image data and high-definition image data, and the low-definition image data having the same content as the high-definition image data;

calling the image processing network to adjust a resolution of the low-definition image data to a target resolution, to obtain sample super-resolution image data, and generating a super-resolution loss function according to the sample super-resolution image data and the high-definition image data;

calling the image processing network to perform image quality enhancement processing on the sample super-resolution image data, to obtain first sample enhanced image data, and generating an image quality loss function according to the first sample enhanced image data and the high-definition image data;

calling the image processing network to perform face enhancement processing on a face image in the first sample enhanced image data, to obtain a sample enhanced face image, fusing the sample enhanced face image with the first sample enhanced image data, to obtain second sample enhanced image data, and generating a face loss function according to the sample enhanced face image and a face image in the high-definition image data;

calling the image processing network to perform image sharpening processing on the second sample enhanced image data, to obtain sample sharpened image data, and generating a sharpening loss function according to the sample sharpened image data and the high-definition image data; and updating a network parameter of the image processing network according to the super-resolution loss function, the image quality loss function, the face loss function, and the sharpening loss function, to obtain the trained image processing network.

13. A non-transitory computer-readable storage medium, storing computer-readable instructions, and the computer-readable instructions, when being executed by a processor of a computer device, causing the computer device to perform an image processing method including:

converting initial image data into super-resolution image data using a trained image processing network, a resolution of the super-resolution image data being greater than or equal to a target resolution;

performing image quality enhancement processing on the super-resolution image data using the trained image processing network, to obtain first enhanced image data;

when there is a face image in the first enhanced image data, performing face enhancement on the face image in the first enhanced image data using the trained image processing network to obtain second enhanced image data;

extracting high-frequency image information in the second enhanced image data using a sharpening network;

generating a sharpening mask for the second enhanced image data by the sharpening network;

extracting sharpened image information in the second enhanced image data according to the sharpening mask;

predicting a first weighted weight for the high-frequency image information, a second weighted weight for the sharpened image information, and a third weighted weight for the second enhanced image data by the sharpening network; and performing a weighted sum of the high-frequency image information, the sharpened image information, and the second enhanced image data according to the first weighted weight, the second weighted weight, and the third weighted weight, to obtain the sharpened image data.

14. The non-transitory computer-readable storage medium according to claim 13, wherein the trained image processing network comprises a super-resolution network, and the converting initial image data into super-resolution image data using a trained image processing network comprises:

detecting a resolution of the initial image data; and when the resolution of the initial image data is less than the target resolution, adjusting the resolution of the initial image data to the target resolution using the super-resolution network, to obtain the super-resolution image data.

15. The non-transitory computer-readable storage medium according to claim 13, wherein the trained image processing network comprises a face enhancement network; and the performing face enhancement on the face image in the first enhanced image data using the trained image processing network to obtain second enhanced image data comprises:

performing face detection on the first enhanced image data using the face enhancement network; and when there is a face image in the first enhanced image data, performing face enhancement processing on the face image in the first enhanced image data using the face enhancement network, to obtain the second enhanced image data.

16. The non-transitory computer-readable storage medium according to claim 15, wherein the face enhancement network comprises a face detection network, a face enhancement sub-network, and a face fusion network;

the performing face enhancement on the face image in the first enhanced image data using the trained image processing network to obtain second enhanced image data comprises:

cutting out the face image from the first enhanced image data using the face detection network, to obtain a cut-out face image;

performing the face enhancement processing on the cut-out face image using the face enhancement sub-network, to obtain an enhanced face image;

generating a face fusion mask using the face fusion network; and performing image fusion processing on the first enhanced image data and the enhanced face image according to the face fusion mask, to obtain the second enhanced image data.

17. The non-transitory computer-readable storage medium according to claim 13, wherein the initial image data is any one of a plurality of image frames obtained by segmenting video data; and the method further comprises:

generating optimized video data of the video data according to the sharpened image data corresponding to each image frame in the plurality of image frames; and pushing the optimized video data to an application client, to allow the application client to output the optimized video data.

* * * * *